US012516272B2

(12) United States Patent
Doering et al.

(10) Patent No.: US 12,516,272 B2
(45) Date of Patent: Jan. 6, 2026

(54) CLEANING AGENT COMPRISING PROTEASE FOR AUTOMATIC DOSING

(71) Applicant: Henkel AG & Co. KGaA, Duesseldorf (DE)

(72) Inventors: Thomas Doering, Dormagen (DE); Thomas Weber, Weimar (DE); Christian Degering, Erkrath (DE); Susanne Wieland, Zons/Dormagen (DE); Brigitte Kempen, Duesseldorf (DE); Nina Mussmann, Willich (DE)

(73) Assignee: Henkel AG & Co. KGaA, Dusseldorf (DE)

( * ) Notice: Subject to any disclaimer, the term of this patent is extended or adjusted under 35 U.S.C. 154(b) by 764 days.

(21) Appl. No.: 17/628,591

(22) PCT Filed: Jul. 16, 2020

(86) PCT No.: PCT/EP2020/070122
§ 371 (c)(1),
(2) Date: Jan. 20, 2022

(87) PCT Pub. No.: WO2021/013686
PCT Pub. Date: Jan. 28, 2021

(65) Prior Publication Data
US 2022/0251479 A1 Aug. 11, 2022

(30) Foreign Application Priority Data
Jul. 22, 2019 (EP) .................... 19187520

(51) Int. Cl.
| | | |
|---|---|---|
| *C11D 3/386* | (2006.01) | |
| *C11D 3/00* | (2006.01) | |
| *C11D 3/04* | (2006.01) | |
| *C11D 3/10* | (2006.01) | |
| *C11D 3/20* | (2006.01) | |
| *C11D 3/32* | (2006.01) | |
| *C11D 3/34* | (2006.01) | |
| *C11D 3/36* | (2006.01) | |
| *C11D 3/37* | (2006.01) | |
| *C11D 17/04* | (2006.01) | |
| *C12N 9/54* | (2006.01) | |

(52) U.S. Cl.
CPC ........ *C11D 3/38618* (2013.01); *C11D 3/0073* (2013.01); *C11D 3/046* (2013.01); *C11D 3/10* (2013.01); *C11D 3/2086* (2013.01); *C11D 3/323* (2013.01); *C11D 3/3409* (2013.01); *C11D 3/361* (2013.01); *C11D 3/3773* (2013.01); *C11D 17/045* (2013.01); *C12N 9/54* (2013.01); *C12Y 304/21062* (2013.01); *C11D 2111/18* (2024.01)

(58) Field of Classification Search
None
See application file for complete search history.

(56) References Cited

U.S. PATENT DOCUMENTS

| | | | | |
|---|---|---|---|---|
| 9,260,706 B2* | 2/2016 | Wieland | ............ | C11D 3/38609 |
| 9,365,844 B2* | 6/2016 | Siegert | .................. | C11D 3/386 |
| 9,803,183 B2* | 10/2017 | Degering | ............... | C12N 15/70 |
| 10,457,928 B2* | 10/2019 | Hellmuth | ................ | C12N 9/54 |
| 10,494,622 B2* | 12/2019 | Degering | ............... | C12N 15/75 |
| 10,941,371 B2* | 3/2021 | Herbst | ..................... | C12N 9/54 |
| 11,104,867 B2* | 8/2021 | Mussmann | ............ | C11D 3/386 |
| 2004/0259222 A1 | 12/2004 | Breves et al. | | |
| 2005/0003419 A1 | 1/2005 | Breves et al. | | |
| 2007/0193609 A1 | 8/2007 | Classen et al. | | |
| 2012/0264672 A1 | 10/2012 | Bastigkeit et al. | | |
| 2014/0017763 A1 | 1/2014 | Wieland et al. | | |
| 2014/0227764 A1 | 8/2014 | Hellmuth et al. | | |
| 2017/0198243 A1 | 7/2017 | Mussmann et al. | | |
| 2019/0144792 A1* | 5/2019 | Herbst | ................... | C11D 3/386 |
| | | | | 510/226 |

FOREIGN PATENT DOCUMENTS

| | | |
|---|---|---|
| CA | 2069855 | 5/1992 |
| DE | 102005062479 A1 | 7/2007 |
| DE | 102016210628 A1 | 12/2017 |
| EP | 0518720 A1 | 12/1992 |
| EP | 1759624 A2 | 3/2007 |
| WO | 9920726 A1 | 4/1999 |
| WO | 03002711 A2 | 1/2003 |
| WO | 03054177 A2 | 7/2003 |
| WO | 2007079938 A2 | 7/2007 |
| WO | 2009037258 A1 | 3/2009 |
| WO | 2011051416 A1 | 5/2011 |
| WO | 2012119955 A1 | 9/2012 |
| WO | 2013060621 A1 | 5/2013 |
| WO | 2015132279 A1 | 9/2015 |
| WO | 2016/000971 A1 | 1/2016 |
| WO | 2016096714 A1 | 6/2016 |
| WO | 2017215925 A1 | 12/2017 |
| WO | 2018118950 A1 | 6/2018 |
| WO | 2012/126536 A1 | 9/2021 |

OTHER PUBLICATIONS

Chica et al. Curr Opin Biotechnol. Aug. 2005;16(4):378-84. (Year: 2005).*
Singh et al. Curr Protein Pept Sci. 2017, 18, 1-11 (Year: 2017).*
Bornscheuer et al. Curr Protoc Protein Sci. Nov. 2011;Chapter 26:Unit26.7. (Year: 2011).*
Yoshikuni et al. Curr Opin Chem Biol. Apr. 2007;11(2):233-9. (Year: 2007).*
Search Report of parallel European patent application No. 19187520.2 dated Jun. 24, 2020, 14 pages, for information purpose only.
Search Report from parallel PCT-application No. PCT/EP2020/070122 dated Dec. 14, 2020, 9 pages, for Information purpose only.
(Continued)

*Primary Examiner* — Christian L Fronda
(74) *Attorney, Agent, or Firm* — Blank Rome LLP

(57) ABSTRACT

A liquid cleaning agent composition may include at least one suitable protease and water in an amount of at least 30 wt. % and less, preferably 25 wt. % and less, in particular 15 wt. % or less based on the total composition.

19 Claims, No Drawings

Specification includes a Sequence Listing.

(56) References Cited

OTHER PUBLICATIONS

Stephen F. Altschul et al., "Basic Local Alignment Search Tool", J. Mol. Biol., 1990, pp. 403-410, vol. 215, Academic Press Limited.
Stephen F. Altschul et al., "Gapped BLAST and PSI-BLAST: a new generation of protein database search programs", Nucleic Acids Research, 1997, pp. 3389-3402, vol. 25, No. 17.
Ramu Chenna et al., "Multiple sequence alignment with the Clustal series of programs", Nucleic Acids Research, 2003, pp. 3497-3500, vol. 31, No. 13, Oxford University Press.
Cédric Notredame et al., "T-Coffee: A Novel Method for Fast and Accurate Multiple Sequence Alignment", J. Mol. Biol. (2000) pp. 205-217, vol. 302, Academic Press.

* cited by examiner

CLEANING AGENT COMPRISING PROTEASE FOR AUTOMATIC DOSING

CROSS-REFERENCE TO RELATED APPLICATIONS

The present application is a national stage entry according to 35 U.S.C. § 371 of PCT Application No. PCT/EP2020/070122 filed on Jul. 16, 2020; which claims priority to European Patent Application Serial No. 19 187 520.2 filed on Jul. 22, 2019; all of which are incorporated herein by reference in their entirety and for all purposes.

REFERENCE TO A SEQUENCE LISTING SUBMITTED VIA EFS-WEB

The content of the ASCII text file of the sequence listing named "P82803_SeqPrpt.txt", which is 22 kb in size was created on Jul. 22, 2019 and electronically submitted via EFS-Web herewith; the sequence listing is incorporated by reference in its entirety.

TECHNICAL FIELD

The disclosure relates to a liquid cleaning agent preparation which comprises 30 wt. % and less, preferably 25 wt. % and less, in particular 15 wt. % and less, water, and at least one suitable protease. The disclosure also relates to cleaning agent combinations comprising said preparation.

BACKGROUND

The forms in which cleaning agents are packaged and sold are subject to constant changes. For some time, special attention has been paid to the easy dosing of cleaning agents and the simplification of the operational steps required to carry out a cleaning process.

In particular devices for multiple dosing of cleaning agents are desired by consumers. In this case, a distinction can be made between devices in dosing containers integrated into the dishwasher and separate devices which are independent of the dishwasher. Portions of cleaning agent are dosed, automatically or semi-automatically, into the interior of the cleaning machine over the course of several sequential cleaning processes by means of these devices, which contain many times the amount of cleaning agent needed to carry out a cleaning process. For the consumer, there is thus no need to dose the cleaning agent before the start of each individual cleaning cycle. Examples of such devices are described in European patent application EP 1 759 624 A2 (Reckitt Benckiser) or in German patent application DE 10 2005 062 479 A1 (BSH Bosch and Siemens Hausgerate GmbH).

In particular, consumers having relatively low volumes of washing-up/laundry want a solution that is uncomplicated and easy to use.

Regardless of the exact design of the dosing devices used in the interior of dishwashers, the cleaning agents contained in these devices for multiple dosing are also exposed to in particular changing temperatures over a longer period of time, these temperatures being the first approximation of the water temperatures used to carry out the cleaning processes. These temperatures may be up to 95° C., although usually only temperatures of between 50 and 75° C. are reached in the field of automatic dishwashing. A cleaning agent contained in a device provided for multiple dosing is accordingly repeatedly heated in the course of several cleaning processes to temperatures well above the temperatures customary for transport and storage, with temperature-sensitive active substances being affected in particular.

In particular consumers who load the dishwasher with dishes over several days and who leave the soiled items to be washed uncleaned inside the dishwasher for some time before a wash cycle is carried out have the problem that the cleaning performance of the products, particularly in the case of stubborn, in particular dried-on food residues on the items to be washed, for example porridge oats or tea, leaves much to be desired in comparison with prompt washing after the items have been used. However, rinsing off food residues before sorting into the dishwasher is not advantageous for ecological and time-related reasons and with regard to the additional water costs.

SUMMARY

The object of the present application was therefore to provide a cleaning agent/a cleaning agent product form, comprising such a cleaning agent, which provides good cleaning performance, in particular on difficult dried-on food residues, in particular minced meat and/or egg yolk and/or tea, even if there are several days between the individual usage cycles. In particular, this system should have little outlay for the consumer.

Therefore, the present application relates first to a liquid cleaning agent preparation (at 20° C., 1013 bar), preferably a dishwashing detergent preparation, in particular an automatic dishwashing detergent preparation, preferably a phosphate-free automatic dishwashing detergent preparation, which comprises 30 wt. % and less, preferably 25 wt. % and less, in particular 15 wt. % and less, water, and comprises at least one protease, preferably a protease derived from subtilisin, and/or in particular a protease selected from the group of proteases according to (i) to (v), the at least one protease (i) comprising an amino acid sequence which has, over the entire length thereof, at least 70% sequence identity with the amino acid sequence given in SEQ ID NO. 1 and which has an amino acid substitution at at least one of the positions corresponding to positions 212, 12, 43, 122, 127, 154, 156, 160, 211 or 222, in each case based on the numbering according to SEQ ID NO. 1, in particular the at least one amino acid substitution being selected from the group consisting of Q12L, I43V, M122L, D127P, N154S, T156A, G160S, M211N, M211L, P212D, P212H or A222S, in each case based on the numbering according to SEQ ID NO. 1, and/or particularly preferably comprising one of the following amino acid substitutions, in each case based on the numbering according to SEQ ID NO. 1:
 a. I43V;
 b. M122L, N154S and T156A;
 c. M211N and P212D;
 d. M211L and P212D;
 e. G160S;
 f. D127P, M211L and P212D;
 g. P212H; or
 h. Q12L, M122L and A222S;

(ii) comprising an amino acid sequence which comprises a subtilisin 309 from *Bacillus lentus*, in particular one which comprises an amino acid sequence which is at least 80%, preferably at least 90%, in particular 100%, identical to the amino acid sequence shown in SEQ ID NO. 2 over its entire length and has at least one amino acid substitution at one of positions 9, 15, 66, 212 and 239 in the numbering according to SEQ ID NO. 2, preferably selected from the group consisting of S9R, A15T, V66A, N212D and Q239R;

iii) comprising an amino acid sequence which comprises a subtilisin 309 from *Bacillus lentus*, in particular one which comprises an amino acid sequence which is at least 80%, preferably at least 90%, in particular 100%, identical to the amino acid sequence specified in SEQ ID NO. 2 over its entire length and has an amino acid substitution at position 97 and an insertion of an amino acid between the amino acids at positions 97 and 98 in the numbering according to SEQ ID NO. 2, preferably selected from S97A and/or S97AD;

iv) comprising an amino acid sequence which is at least 80%, preferably at least 90%, in particular 100%, identical to the amino acid sequence specified in SEQ ID NO. 3 over its entire length and optionally has at least one amino acid substitution at one of the following positions 32, 33, 48-54, 58-62, 94-107, 116, 123-133, 150, 152-156, 158-161, 164, 169, 175-186, 197, 198, 203-216 in the numbering according to SEQ ID NO. 3, in particular at least one amino acid substitution at one, two, three or four of the following positions 116, 126, 127, 128 and 160 in the numbering according to SEQ ID NO. 3, preferably at least one, even more preferably a plurality, most preferably each, of the amino acid substitutions G116V, S126L, P127Q and/or S128A; or v) comprising an amino acid sequence which comprises an alkaline protease from *Bacillus lentus* DSM 5483, in particular one which comprises an amino acid sequence which is at least 80%, preferably at least 90%, in particular 100%, identical to the amino acid sequence shown in SEQ ID NO. 4 over its entire length and optionally has at least one amino acid substitution at one, two, three or four of the following positions 3, 4, 99 and 199 in the numbering according to SEQ ID NO. 4, in particular the amino acid substitutions R99E or R99D, and optionally at least one or two, preferably all three, of the amino acid substitutions S3T, V4I and V199I.

According to a preferred embodiment, the weight proportion of all proteases, based on the content of active enzyme protein, with respect to the total weight of the cleaning agent preparation is 0.0005 to 10.0 wt. %, preferably 0.001 to 7.0 wt. %, more preferably 0.01 to 4.0 wt. % and even more preferably 0.1 to 2.0 wt. %.

Among the proteases, subtilisin-type proteases are preferred. Examples of these are the subtilisins BPN' and Carlsberg, as well as the developed forms thereof, protease PB92, subtilisins 147 and 309, the alkaline protease from *Bacillus lentus*, subtilisin DY, and the enzymes thermitase, proteinase K and proteases TW3 and TW7, which belong to the subtilases but no longer to the subtilisins in the narrower sense.

DETAILED DESCRIPTION

Surprisingly, it has been found that certain proteases, in particular the proteases which are derived from certain subtilisins, are particularly suitable for use in low-water liquid cleaning agents. In particular, they can be used in cleaning agent product forms which contain several partial amounts of preparations and are thus preferably suitable for automatic dosing. These proteases are able to withstand the temperature increases in a dishwasher several times in succession when carrying out several washing cycles.

In a very particularly preferred embodiment, the protease used comprises an amino acid sequence which, over its entire length, is preferably at least 70%, 71%, 72%, 73%, 74%, 75%, 76%, 77%, 78%, 79%, 80%, 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5% and 98.8% identical to the amino acid sequence given in SEQ ID NO. 1, and preferably comprises one or more amino acid substitutions 12L, 43V, 122L, 127P, 154S, 156A, 160S, 211N, 211L, 212D, 212H or 222S at at least one of the positions corresponding to positions 12, 43, 122, 127, 154, 156, 160, 211, 212 or 222 in the numbering according to SEQ ID NO. 1.

In a further embodiment, the protease used has an amino acid sequence which, over its entire length, is at least 81% and increasingly preferably at least 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5% and 98.8% identical to the amino acid sequence specified in SEQ ID NO. 2 and which preferably corresponds to at least one amino acid substitution at one of positions 9, 15, 66, 212 and 239 in the numbering according to SEQ ID NO. 2, has one or more amino acid substitutions, preferably selected from the group consisting of 9R, 15T, 66A, 212D or 239R.

In a further embodiment, the protease used has an amino acid sequence which, over its entire length, is at least 81% and increasingly preferably at least 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5% and 98.8% identical to the amino acid sequence specified in SEQ ID NO. 2 and which has an amino acid substitution at position 97 and an insertion of an amino acid between the amino acids at positions 97 and 98 in the numbering according to SEQ ID NO. 2, preferably selected from 97A and/or 97AD.

In a further embodiment, the protease used has an amino acid sequence which, over its entire length, is at least 81% and increasingly preferably at least 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5% and 98.8% identical to the amino acid sequence specified in SEQ ID NO. 3 and which preferably has, at at least one of the positions corresponding to positions 32, 33, 48-54, 58-62, 94-107, 116, 123-133, 150, 152-156, 158-161, 164, 169, 175-186, 197, 198, 203-216 in the numbering according to SEQ ID NO. 3, in particular at least one amino acid substitution at one, two, three or four of the following positions 116, 126, 127, 128 and 160 in the numbering according to SEQ ID NO. 3, preferably at least one, more preferably a plurality, most preferably each of the amino acid substitutions 116V, 126L, 127Q and/or 128A.

In a further embodiment, the protease used has an amino acid sequence which, over its entire length, is at least 81% and increasingly preferably at least 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5% and 98.8% identical to the amino acid sequence specified in SEQ ID NO. 4 and which preferably has, at at least one of the positions corresponding to positions 3, 4, 99 and 199 in the numbering according to SEQ ID NO. 4, in particular the amino acid substitution 99E or 99D, and optionally additionally at least one or two, preferably all three of the amino acid substitutions 3T, 4I and 199I.

Particularly preferably, a protease is comprised (optionally in addition to further enzymes) which comprises an amino acid sequence which has, over the entire length thereof, at least 70% sequence identity with the amino acid sequence given in SEQ ID NO. 1 (*B. gibsonii* wt) and which has an amino acid substitution at at least one of the positions corresponding to positions 12, 43, 122, 127, 154, 156, 160, 211, 212 or 222, in each case based on the numbering according to SEQ ID NO. 1, in particular the at least one amino acid substitution being selected from the group consisting of Q12L, I43V, M122L, D127P, N154S, T156A, G160S, M211N, M211L, P212D, P212H or A222S, in each case based on the numbering according to SEQ ID NO. 1, and/or particularly preferably is a protease comprising one of the following amino acid substitutions, in each case based on the numbering according to SEQ ID NO. 1:

(i) I43V;
(ii) M122L, N154S and T156A;
(iii) M211N and P212D;
(iv) M211L and P212D;
(v) G160S;
(vi) D127P, M211L and P212D;
(vii) P212H; or
(viii) Q12L, M122L and A222S.

A cleaning agent combination or cleaning agent product form may include:
a) a liquid (20° C.) cleaning agent preparation A, containing a builder;
b) a liquid (20° C.) cleaning agent preparation B that is different from cleaning agent preparation A, containing
b1) at least one protease, which is preferably a protease derived from subtilisins, and/or in particular a protease according to (i) to (v), the at least one protease
(i) comprising an amino acid sequence which has, over the entire length thereof, at least 70% sequence identity with the amino acid sequence given in SEQ ID NO. 1 and which has an amino acid substitution at at least one of the positions corresponding to positions 12, 43, 122, 127, 154, 156, 160, 211, 212 or 222, in each case based on the numbering according to SEQ ID NO. 1, in particular the at least one amino acid substitution being selected from the group consisting of Q12L, I43V, M122L, D127P, N154S, T156A, G160S, M211N, M211L, P212D, P212H or A222S, in each case based on the numbering according to SEQ ID NO. 1, and/or particularly preferably comprising one of the following amino acid substitutions, in each case based on the numbering according to SEQ ID NO. 1:
a. I43 V;
b. M122L, N154S and T156A;
c. M211N and P212D;
d. M211L and P212D;
e. G160S;
f. D127P, M211L and P212D;
g. P212H; or
h. Q12L, M122L and A222S;
(ii) comprising an amino acid sequence which comprises a subtilisin 309 from *Bacillus lentus*, in particular one which comprises an amino acid sequence which is at least 80%, preferably at least 90%, in particular 100%, identical to the amino acid sequence shown in SEQ ID NO. 2 over its entire length and has at least one amino acid substitution at one of positions 9, 15, 66, 212 and 239 in the numbering according to SEQ ID NO. 2, preferably selected from the group consisting of S9R, A15T, V66A, N212D and Q239R;
iii) comprising an amino acid sequence which comprises a subtilisin 309 from *Bacillus lentus*, in particular one which comprises an amino acid sequence which is at least 80%, preferably at least 90%, in particular 100%, identical to the amino acid sequence specified in SEQ ID NO. 2 over its entire length and has an amino acid substitution at position 97 and an insertion of an amino acid between the amino acids at positions 97 and 98 in the numbering according to SEQ ID NO. 2, preferably selected from S97A and/or S97AD;
iv) comprising an amino acid sequence which is at least 80%, preferably at least 90%, in particular 100%, identical to the amino acid sequence specified in SEQ ID NO. 3 over its entire length and optionally has at least one amino acid substitution at one of the following positions 32, 33, 48-54, 58-62, 94-107, 116, 123-133, 150, 152-156, 158-161, 164, 169, 175-186, 197, 198, 203-216 in the numbering according to SEQ ID NO. 3, in particular at least one amino acid substitution at one, two, three or four of the following positions 116, 126, 127, 128 and 160 in the numbering according to SEQ ID NO. 3, preferably at least one, even more preferably a plurality, most preferably each, of the amino acid substitutions G116V, S126L, P127Q and/or S128A; or
v) comprising an amino acid sequence which comprises an alkaline protease from *Bacillus lentus* DSM 5483, in particular one which comprises an amino acid sequence which is at least 80%, preferably at least 90%, in particular 100%, identical to the amino acid sequence shown in SEQ ID NO. 4 over its entire length and optionally has at least one amino acid substitution at one, two, three or four of the following positions 3, 4, 99 and 199 in the numbering according to SEQ ID NO. 4, in particular the amino acid substitutions R99E or R99D, and optionally at least one or two, preferably all three, of the amino acid substitutions S3T, V4I and V199I, and b2) optionally a surfactant, preferably a non-ionic surfactant,
c) optionally a liquid (20° C.) cleaning agent preparation C different from cleaning agent preparations A and B, containing
c1) an acidifying agent,
c2) a glass corrosion inhibitor,
c3) optionally a non-ionic surfactant,
c4) optionally a hydrotropic substance, and
c5) optionally less than 1 wt. %, preferably less than 0.5 wt. %, in particular less than 0.1 wt. %, enzyme preparation, and
d) a packaging material in which cleaning agent preparations A, B and optionally C are separate from one another.

Everything described above for the liquid cleaning agent preparation also applies analogously to cleaning agent preparation B of the cleaning agent combination and the cleaning agent product form.

Unless explicitly indicated otherwise, all percentages that are cited in connection with the compositions described herein refer to wt. %, in each case based on the relevant mixture. Unless indicated otherwise, where states of matter (solid, liquid) are mentioned in the present application, these relate to room temperature (20° C.) at normal pressure of 1 bar.

The cleaning agent preparation or the cleaning agent combination and the cleaning agent product form are characterized in that the cleaning agent preparations are phosphate-free, i.e. in that they contain less than 1 wt. % phosphate, preferably less than 0.5 wt. % phosphate, particularly preferably less than 0.1 wt. % phosphate, and in particular no phosphate.

The combination of such a composition with the cleaning agent preparations is advantageous for the consumer in that the consumer does not have to worry too much about renewing or replacing the active ingredient composition and the cleaning agent preparations. The consumer exchanges the combination together and does not have to worry about replacing individual products separately.

Surprisingly, it has been found that the cleaning agent product form has a good cleaning performance, preferably with stubborn food residues on the items to be washed, for example minced meat and egg yolks. Rinsing off food residues before sorting into the dishwasher can therefore be dispensed with, which is particularly advantageous for ecological and time-related reasons and with regard to the additional water costs. The consumer therefore does not have to use the dishwasher excessively often to remove these stubborn food residues promptly until they have dried up considerably, but the consumer can also remove items from the dishwasher with fewer washing cycles per week, which items are clean, in particular with regard to such stubborn soiling.

"Variant," as used herein, relates to naturally or artificially generated variations of a native enzyme which has an amino acid sequence which is modified with respect to the reference form. In addition to the amino acid alterations discussed above, enzymes can have other amino acid alterations, in particular amino acid substitutions, insertions or deletions. Such enzymes are, for example, developed by targeted genetic alteration, i.e. by mutagenesis methods, and optimized for specific applications or with regard to specific properties (for example with regard to their catalytic activity, stability, etc.). Furthermore, nucleic acids can be introduced into recombination approaches and can thus be used to generate completely new types of enzymes or other polypeptides. The aim is to introduce targeted mutations such as substitutions, insertions or deletions into the known molecules in order, for example, to improve the cleaning performance of enzymes. For this purpose, in particular the surface charges and/or the isoelectric point of the molecules and thus their interactions with the substrate can be altered. For instance, the net charge of the enzymes can be altered in order to influence the substrate binding, in particular for use in washing and cleaning agents. Alternatively or additionally, one or more corresponding mutations can increase the stability or catalytic activity of the enzyme and thus improve its cleaning performance. Advantageous properties of individual mutations, e.g. individual substitutions, can complement one another. A protease which has already been optimized with regard to specific properties can therefore also be developed, for example with respect to its stability with respect to surfactants and/or bleaching agents and/or other components.

For the description of substitutions relating to exactly one amino acid position (amino acid exchanges), the following convention is used herein: first, the naturally occurring amino acid is designated in the form of the internationally used one-letter code, followed by the associated sequence position and finally the inserted amino acid. Several exchanges within the same polypeptide chain are separated by slashes. For insertions, additional amino acids are named following the sequence position. In the case of deletions, the missing amino acid is replaced by a symbol, for example a star or a dash, or a Δ is indicated before the corresponding position. For example, P14H describes the substitution of proline at position 14 by histidine, P14HT describes the insertion of threonine following the amino acid histidine at position 14, and P14* or ΔP14 describes the deletion of proline at position 14. This nomenclature is known to a person skilled in the field of enzyme technology.

According to a preferred embodiment, the weight proportion of all proteases, based on the content of active enzyme protein, with respect to the total weight of cleaning agent preparation B is 0.0005 to 10.0 wt. %, preferably 0.001 to 7.0 wt. %, more preferably 0.01 to 4.0 wt. % and even more preferably 0.1 to 2.0 wt. %.

The feature whereby an enzyme, in particular a protease, has the stated substitutions means that it contains at least one of the corresponding amino acids at the corresponding positions, i.e. not all of the 10 positions are otherwise mutated or deleted, for example by fragmentation of the enzyme, in particular the protease.

The identity of nucleic acid or amino acid sequences is determined by a sequence comparison. This sequence comparison is based on the BLAST algorithm established and commonly used in the prior art (cf. for example Altschul et al. (1990): "Basic local alignment search tool," J. Mol. Biol. 215:403-410, and Altschul et al. (1997): "Gapped BLAST and PSI-BLAST: a new generation of protein database search programs," Nucleic Acids Res. 25:3389-3402) and in principle occurs by associating similar sequences of nucleotides or amino acids in the nucleic acid or amino acid sequences. A tabular association of the positions concerned is referred to as alignment. Another algorithm available in the prior art is the FASTA algorithm. Sequence comparisons (alignments), in particular multiple sequence comparisons, are created using computer programs. The Clustal series (cf. e.g. Chenna et al. (2003): "Multiple sequence alignment with the Clustal series of programs," Nucleic Acid Res. 31:3497-3500), T-Coffee (cf. e.g. Notredame et al. (2000): "T-Coffee: A novel method for multiple sequence alignments," J. Mol. Biol. 302:205-217) or programs based on these programs or algorithms are frequently used, for example. Sequence comparisons (alignments) using the computer program Vector NTI® Suite 10.3 (Invitrogen Corporation, 1600 Faraday Avenue, Carlsbad, California, USA) with the predetermined, default parameters, and the AlignX module of which for sequence comparisons is based on ClustalW, are also possible. Unless stated otherwise, the sequence identity given herein is determined by the BLAST algorithm.

A cleaning agent combination or cleaning agent product form may include:
  a) a liquid (20° C.) cleaning agent preparation A, containing a builder;
  b) a liquid (20° C.) cleaning agent preparation B that is different from cleaning agent preparation A, containing
    b1) at least one protease, which is preferably a protease derived from subtilisins, and/or in particular a protease according to (i) to (v), the at least one protease
      (ii) comprising an amino acid sequence which has, over the entire length thereof, at least 70% sequence identity with the amino acid sequence given in SEQ ID NO. 1 and which has an amino acid substitution at at least one of the positions corresponding to positions 12, 43, 122, 127, 154, 156, 160, 211, 212 or 222, in each case based on the numbering according to SEQ ID NO. 1, in particular the at least one amino acid substitution being selected from the group consisting of Q12L, I43V, M122L, D127P, N154S, T156A, G160S, M211N, M211L, P212D, P212H or A222S, in each case based on the numbering according to SEQ ID NO. 1, and/or particularly preferably comprising one of the following amino acid substitutions, in each case based on the numbering according to SEQ ID NO. 1:
i. I43V;
j. M122L, N154S and T156A;
k. M211N and P212D;
l. M211L and P212D;
m. G160S;
n. D127P, M211L and P212D;
o. P212H; or
p. Q12L, M122L and A222S;
and
b2) optionally a surfactant, preferably a non-ionic surfactant,
c) optionally a liquid (20° C.) cleaning agent preparation C different from cleaning agent preparations A and B, containing
c1) an acidifying agent,
c2) a glass corrosion inhibitor,
c3) optionally a non-ionic surfactant,
c4) optionally a hydrotropic substance, and
c5) optionally less than 1 wt. %, preferably less than 0.5 wt. %, in particular less than 0.1 wt. %, enzyme preparation, and
d) a packaging material in which cleaning agent preparations A, B and optionally C are separate from one another.

According to a further preferred embodiment, the weight proportion of this protease(s), based on the amount of active enzyme protein, in cleaning agent preparation B is 0.0005 to 10.0 wt. %, preferably 0.001 to 7.0 wt. %, more preferably 0.01 to 4.0 wt. % and even more preferably 0.1 to 2.0 wt. %, based on the total weight thereof.

According to a further particularly preferred embodiment, the amount of all proteases, based on the amount of active enzyme protein, which is added per wash cycle is preferably 0.001 to 1,000 mg/job, more preferably 0.1 to 600 mg/job and even more preferably 1.0 to 400 mg/job.

Liquid cleaning agent preparations B preferred contain, based on the total weight of cleaning agent preparation B, from 5 to 50 wt. %, preferably from 7 to 40 wt. % and in particular from 10 to 30 wt. %, protease preparations.

This application also relates to cleaning agent combinations which comprise at least the two liquid cleaning agent preparations A and B.

This application also preferably relates to corresponding cleaning agent product forms which are obtained by combining two liquid cleaning agent preparations A and B. Liquid cleaning agent preparations A and B and the active ingredient composition differ from one another in terms of composition.

Cleaning agent preparation A contains one or more builders as a first essential component. The builders include in particular carbonates, organic cobuilders and silicates. Cleaning agent product forms are preferably characterized in that the builder a1) is selected from the group of carbonates, hydrogen carbonates, citrates, silicates, polymeric carboxylates and sulfonic acid group-containing polymers.

A sulfopolymer, preferably a copolymeric polysulfonate, more preferably a hydrophobically modified copolymeric polysulfonate, is preferably used as a sulfonic group-containing polymer. The copolymers can have two, three, four, or more different monomer units. Preferred copolymeric polysulfonates contain, in addition to sulfonic acid group-containing monomer(s), at least one monomer from the group of unsaturated carboxylic acids.

As unsaturated carboxylic acid(s), unsaturated carboxylic acids of formula $R^1(R^2)C=C(R^3)COOH$ are particularly preferably used, in which $R^1$ to $R^3$ represent, independently of one another, —H, —CH$_3$, a straight-chain or branched saturated alkyl functional group having 2 to 12 carbon atoms, a straight-chain or branched, mono- or polyunsaturated alkenyl functional group having 2 to 12 carbon atoms, —NH$_2$, —OH, or —COOH-substituted alkyl or alkenyl functional groups as defined above, or represent —COOH or —COOR$^4$, where R$^4$ is a saturated or unsaturated, straight-chain or branched hydrocarbon functional group having 1 to 12 carbon atoms.

Particularly preferred unsaturated carboxylic acids are acrylic acid, methacrylic acid, ethacrylic acid, α-chloroacrylic acid, α-cyanoacrylic acid, crotonic acid, α-phenylacrylic acid, maleic acid, maleic anhydride, fumaric acid, itaconic acid, citraconic acid, methylene malonic acid, sorbic acid, cinnamic acid, or mixtures thereof. Unsaturated dicarboxylic acids can of course also be used.

For sulfonic acid group-containing monomers, those of the formula $R^5(R^6)C=C(R^7)$—X—SO$_3$H are preferred, in which $R^5$ to $R^7$, independently of one another, represent —H, —CH$_3$, a straight-chain or branched saturated alkyl functional group having 2 to 12 carbon atoms, a straight-chain or branched, mono- or polyunsaturated alkenyl functional group having 2 to 12 carbon atoms, —NH$_2$, —OH, or —COOH-substituted alkyl or alkenyl functional groups, or represent —COOH or —COOR$^4$, where R$^4$ is a saturated or unsaturated, straight-chain or branched hydrocarbon functional group having 1 to 12 carbon atoms, and X represents an optionally present spacer group that is selected from —(CH$_2$)$_n$—, where n=0 to 4, —COO—(CH$_2$)$_k$—, where k=1 to 6, —C(O)—NH—C(CH$_3$)$_2$—, —C(O)—NH—C(CH$_3$)$_2$—CH$_2$— and —C(O)—NH—CH(CH$_3$)—CH$_2$—.

Among these monomers, those of formulas H$_2$C=CH—X—SO$_3$H, H$_2$C=C(CH$_3$)—X—SO$_3$H or HO$_3$S—X—(R$^6$)C=C(R$^7$)—X—SO$_3$H, are preferred, in which R$^6$ and R$^7$ are selected, independently of one another, from —H, —CH$_3$, —CH$_2$CH$_3$, —CH$_2$CH$_2$CH$_3$ and —CH(CH$_3$)$_2$, and X represents an optionally present spacer group that is selected from —(CH$_2$)$_n$—, where n=0 to 4, —COO—(CH$_2$)$_k$—, where k=1 to 6, C(O)—NH—C(CH$_3$)$_2$—, —C(O)—NH—C(CH$_3$)$_2$—CH$_2$— and —C(O)—NH—CH(CH$_3$)—CH$_2$—.

According to a particularly preferred embodiment, cleaning agent preparation A contains a polymer comprising, as a sulfonic acid group-containing monomer, acrylamidopropanesulfonic acids, methacrylamidomethylpropanesulfonic acids or acrylamidomethylpropanesulfonic acid.

Particularly preferred sulfonic acid group-containing monomers are 1-acrylamido-1-propanesulfonic acid, 2-acrylamido-2-propanesulfonic acid, 2-acrylamido-2-methyl-1-propanesulfonic acid, 2-methacrylamido-2-methyl-1-propanesulfonic acid, 3-methacrylamido-2-hydroxypropanesulfonic acid, allyl sulfonic acid, methallyl sulfonic acid, allyloxybenzene sulfonic acid, methallyloxybenzene sulfonic acid, 2-hydroxy-3-(2-propenyloxy)propanesulfonic acid, 2-methyl-2-propene-1-sulfonic acid, styrene sulfonic acid, vinylsulfonic acid, 3-sulfopropyl acrylate, 3-sulfopropyl methacrylate, sulfomethacrylamide, sulfomethylmethacrylamide, as well as mixtures of the above acids or water-soluble salts thereof. The sulfonic acid groups can be present in the polymers in a fully or partially neutralized form, i.e. the acidic hydrogen atom of the sulfonic acid group can be replaced in some or all of the sulfonic acid groups with metal ions, preferably alkali metal ions, and in particular with sodium ions. The use of partially or fully neutralized sulfonic acid group-containing copolymers is preferred.

In copolymers that contain only carboxylic acid group-containing monomers and sulfonic acid group-containing monomers, the monomer distribution of the copolymers that are preferably used is preferably from 5 to 95 wt. % in each case; particularly preferably, the proportion of the sulfonic acid group-containing monomer is from 50 to 90 wt. %, and the proportion of the carboxylic acid group-containing monomer is from 10 to 50 wt. %, with the monomers preferably being selected from those mentioned above. The molar mass of the sulfo-copolymers that are preferably used can be varied in order to adapt the properties of the polymers to the desired intended use. Preferred cleaning agents are characterized in that the copolymers have molar masses from 2,000 to 200,000 g·mol$^{-1}$, preferably from 4,000 to 25,000 g·mol$^{-1}$ and in particular from 5,000 to 15,000 g·mol$^{-1}$.

In another preferred embodiment, the copolymers also comprise, in addition to carboxyl group-containing monomers and sulfonic acid group-containing monomers, at least one non-ionic, preferably hydrophobic monomer. In particular the rinsing performance of dishwashing detergents was able to be improved by using these hydrophobically modified polymers.

Particularly preferably, cleaning agent preparation A also comprises an anionic copolymer, a copolymer comprising
  i) carboxylic acid group-containing monomers
  ii) sulfonic acid group-containing monomers
  iii) optionally non-ionic monomers, in particular hydrophobic monomers being used as the anionic copolymer.

As non-ionic monomers, monomers of general formula $R^1(R^2)C=C(R^3)-X-R^4$ are preferably used, in which $R^1$ to $R^3$ represent, independently of one another, —H, —CH$_3$ or —C$_2$H$_5$, X represents an optionally present spacer group selected from —CH$_2$—, —C(O)O— and —C(O)—NH—, and $R^4$ represents a straight-chain or branched saturated alkyl functional group having 2 to 22 carbon atoms or an unsaturated, preferably aromatic functional group having 6 to 22 carbon atoms.

Particularly preferred non-ionic monomers are butene, isobutene, pentene, 3-methylbutene, 2-methylbutene, cyclopentene, hexene, hexene-1, 2-methlypentene-1, 3-methlypentene-1, cyclohexene, methylcyclopentene, cycloheptene, methylcyclohexene, 2,4,4-trimethylpentene-1, 2,4,4-trimethylpentene-2,2,3-dimethylhexene-1, 2,4-dimethylhexene-1, 2, 5-dimethylhexene-1, 3, 5-dimethylhexene-1, 4,4-dimethylhexane-1, ethylcyclohexene, 1-octene, α-olefins having 10 or more carbon atoms such as 1-decene, 1-dodecene, 1-hexadecene, 1-octadecene and C$_{22}$ α-olefin, 2-styrene, α-methylstyrene, 3-methyl styrene, 4-propyl styrene, 4-cyclohexyl styrene, 4-dodecyl styrene, 2-ethyl-4-benzyl styrene, 1-vinyl naphthalene, 2-vinyl naphthalene, acrylic acid methyl ester, acrylic acid ethyl ester, acrylic acid propyl ester, acrylic acid butyl ester, acrylic acid pentyl ester, acrylic acid hexyl ester, methacrylic acid methyl ester, N-(methyl)acrylamide, acrylic acid-2-ethylhexyl ester, methacrylic acid-2-ethylhexyl ester, N-(2-ethylhexyl)acrylamide, acrylic acid octyl ester, methacrylic acid octyl ester, N-(octyl)acrylamide, acrylic acid lauryl ester, methacrylic acid lauryl ester, N-(lauryl)acrylamide, acrylic acid stearyl ester, methacrylic acid stearyl ester, N-(stearyl)acrylamide, acrylic acid behenyl ester, methacrylic acid behenyl ester, and N-(behenyl)acrylamide or mixtures thereof, in particular acrylic acid, ethyl acrylate, 2-acrylamido-2-methylpropanesulfonic acid (AMPS) as well as mixtures thereof.

Preferred cleaning agent product forms comprise a cleaning agent preparation A which contains, based on the total weight thereof, from 2 to 50 wt. %, preferably from 6 to 45 wt. %, and in particular from 10 to 40 wt. %, builder.

It is particularly preferable to use builders a1) from the group of carbonates and/or hydrogen carbonates, preferably alkali carbonates, particularly preferably sodium carbonate, in amounts of from 2 to 30 wt. %, preferably from 4 to 25 wt. %, and in particular from 6 to 20 wt. %, in each case based on the weight of cleaning agent preparation A.

Polycarboxylates/polycarboxylic acids, polymeric carboxylates, aspartic acid, polyacetals, dextrins and organic cobuilders are particularly noteworthy as organic cobuilders. These classes of substances are described below.

Organic builders that can be used are the polycarboxylic acids that can be used in the form of the free acids and/or the sodium salts thereof, for example, with polycarboxylic acids being understood to mean those carboxylic acids which carry more than one acid function. These include, for example, citric acid, adipic acid, succinic acid, glutaric acid, malic acid, tartaric acid, maleic acid, fumaric acid, saccharic acids, provided that the use thereof is not objectionable for ecological reasons, and mixtures thereof. In addition to their builder effect, the free acids typically also have the property of being an acidification component and are thus also used for setting a lower and milder pH of cleaning agents. Particularly noteworthy here are citric acid, succinic acid, glutaric acid, adipic acid, gluconic acid, and any mixtures thereof.

Particularly preferred cleaning agent preparations A contain citrate as one of their essential builders. Cleaning agent product forms characterized in that cleaning agent preparation A contains, based on the total weight thereof, 2 to 40 wt. %, preferably 3 to 25 wt. %, and in particular 4 to 20 wt. %, citrate are preferred. Citrate and citric acid have been found to be the most effective builders in terms of cleaning performance, such as rinsing performance and in particular deposit inhibition, particularly in combination with phosphonate, in particular 1-hydroxyethane-1,1-diphosphonic acid (if permitted by regulations), and/or the sulfonic acid group-containing polymers.

Cleaning agent product forms are particularly preferred in which cleaning agent preparation A contains, in each case based on the total weight thereof, citrate in amounts of from 3 to 25 wt. %, in particular from 4 to 20 wt. %, and carbonate in amounts of 4 to 25 wt. %, in particular 6 to 20 wt. %.

Polymeric polycarboxylates are also suitable as builders; these are, for example, the alkali metal salts of polyacrylic acid or polymethacrylic acid, for example those having a relative molecular mass of from 500 to 70,000 g/mol.

Suitable polymers are in particular polyacrylates which preferably have a molecular mass of from 2,000 to 20,000 g/mol. Due to their superior solubility, the short-chain polyacrylates, which have molar masses of from 2,000 to 10,000 g/mol, and particularly preferably from 3,000 to 5,000 g/mol, may in turn be preferred from this group.

In addition, copolymeric polycarboxylates are suitable, in particular those of acrylic acid with methacrylic acid and those of acrylic acid or methacrylic acid with maleic acid. Copolymers of acrylic acid with maleic acid which contain from 50 wt. % to 90 wt. % acrylic acid and from 50 wt. % to 10 wt. % maleic acid have been found to be particularly suitable. The relative molecular mass thereof, based on free acids, is generally from 2,000 to 70,000 g/mol, preferably from 20,000 to 50,000 g/mol, and in particular from 30,000 to 40,000 g/mol.

The content of (co)polymeric polycarboxylates in the automatic dishwashing detergent is preferably from 0.5 to 20 wt. %, in particular from 3 to 10 wt. %.

Automatic dishwashing detergents can also contain, as a builder, crystalline layered silicates of general formula $NaMSi_xO_{2x+1} \cdot y\, H_2O$ where M represents sodium or hydrogen, x is a number from 1.9 to 22, preferably from 1.9 to 4, with 2, 3, or 4 being particularly preferred values for x, and y represents a number from 0 to 33, preferably from 0 to 20.

It is also possible to use amorphous sodium silicates with an $Na20:SiO_2$ modulus of from 1:2 to 1:3.3, preferably from 1:2 to 1:2.8, and in particular from 1:2 to 1:2.6, which preferably exhibit retarded dissolution and secondary washing properties.

In preferred automatic dishwashing detergents, the silicate content, based on the total weight of the automatic dishwashing detergent, is limited to amounts below 10 wt. %, preferably below 5 wt. %, and in particular below 2 wt. %.

Particularly preferred automatic dishwashing detergents are silicate-free.

The automatic dishwashing detergents may of course contain the above-mentioned builders both in the form of individual substances and in the form of substance mixtures composed of two, three, four or more builders.

Particularly preferred liquid automatic dishwashing detergents are characterized in that the dishwashing detergent contains at least two builders from the group of carbonates and citrates, and sulfonic acid group-containing polymers, with the proportion by weight of these builders, based on the total weight of the automatic dishwashing detergent, being preferably from 2 to 50 wt. %, more preferably from 5 to 45 wt. %, and in particular from 10 to 40 wt. %. The combination of two or more builders from the above-mentioned group has been found to be advantageous for the cleaning and rinsing performance of automatic dishwashing detergents.

As a further component, cleaning agent preparation A can contain a complexing agent which is different from the above-mentioned builders. The proportion by weight of the complexing agent with respect to the total weight of cleaning agent preparation A is preferably from 2 to 60 wt. %, preferably from 4 to 55 wt. % and in particular from 8 to 50 wt. %.

A further group of preferred complexing agents are the phosphonates, if they can be used for regulatory reasons. In addition to 1-hydroxyethane-1,1-diphosphonic acid, the complexing phosphonates include a number of different compounds such as diethylenetriamine penta(methylene phosphonic acid) (DTPMP). Hydroxy alkane or amino alkane phosphonates are particularly preferred in this application. Among the hydroxy alkane phosphonates, 1-hydroxyethane-1,1-diphosphonate (HEDP) has particular significance as a cobuilder. It is preferably used as a sodium salt, the disodium salt reacting in a neutral manner and the tetrasodium salt reacting in an alkaline manner (pH 9). Possible aminoalkane phosphonates preferably include ethylenediamine tetramethylene phosphonate (EDTMP), diethylentriamine pentamethylene phosphonate (DTPMP) and the higher homologs thereof. They are preferably used in the form of the neutrally reacting sodium salt, for example as the hexasodium salt of EDTMP or as the hepta- and octa-sodium salt of DTPMP. Of the class of phosphonates, HEDP is preferably used as a builder. The aminoalkane phosphonates additionally have a pronounced heavy-metal-binding power. Accordingly, it may be preferred, in particular if the agents also contain bleach, to use aminoalkane phosphonates, in particular DTPMP, or to use mixtures of the mentioned phosphonates.

A cleaning agent composition A preferred in the context of this application contains one or more phosphonate(s) from the group
  a) aminotrimethylene phosphonic acid (ATMP) and/or the salts thereof;
  b) ethylenediamine tetra(methylene phosphonic acid) (EDTMP) and/or the salts thereof;
  c) diethylenetriamine penta(methylene phosphonic acid) (DTPMP) and/or the salts thereof;
  d) 1-hydroxyethane-1,1-diphosphonic acid (HEDP) and/or the salts thereof;
  e) 2-phosphonobutane-1,2,4-tricarboxylic acid (PBTC) and/or the salts thereof;
  f) hexamethylenediamine tetra(methylene phosphonic acid) (HDTMP) and/or the salts thereof;
  g) nitrilotri(methylene phosphonic acid) (NTMP) and/or the salts thereof.

Particularly preferred cleaning agent compositions A are those which contain 1-hydroxyethane-1, 1-diphosphonic acid (HEDP) or diethylenetriamine penta(methylene phosphonic acid) (DTPMP) as phosphonates.

The automatic dishwashing detergents may of course contain two or more different phosphonates (if permitted by regulations). The proportion by weight of the phosphonates with respect to the total weight of cleaning agent compositions A is preferably 1 to 9 wt. %, more preferably 1.2 to 8 wt. %, and in particular 1.5 to 6 wt. %.

Particularly preferred cleaning agent product forms are characterized in that they can also contain further complexing agents selected from the group of hydroxyethyl ethylenediaminetriacetic acid, ethylenediaminetetraacetic acid, diethylenetriaminepentaacetic acid, iminodisuccinic acid, hydroxyiminodisuccinic acid, aspartic acid diacetic acid, hydroxyethane-1,1-diphosphonic acid or diethylenetriamine penta(methylenephosphonic acid) and the salts thereof or mixtures thereof.

According to a particularly preferred embodiment, cleaning agent preparation A contains the complexing agents selected from phosphonates, if permitted for regulatory reasons, and/or MGDA and the respective salts thereof. In particular, the builders in turn include citrate and carbonate and/or hydrogen carbonate and optionally at least one sulfonic acid group-containing polymer.

Cleaning preparation A can contain, as complexing agents, L-glutamic acid-N,N-diacetic acid and/or the corresponding alkali salt (GLDA), preferably the tetrasodium salt, and/or methylglycine diacetic acid and/or the corresponding alkali salt (MGDA), preferably the trisodium salt. The trisodium salt of methylglycine diacetic acid is very particularly preferably contained. The terms methylglycine diacetic acid and L-glutamic acid-N,N-diacetic acid cover not only the free acids, but also the salts thereof, for example the sodium or potassium salts thereof.

Preferred cleaning agent preparations A are characterized in that these contain, based on the total weight of cleaning agent preparations A, 3 to 30 wt. %, preferably 10 to 20 wt. %, preferably 11 to 18 wt. % and in particular 12 to 15.5%, very particularly preferably 13 to 15 wt. %, glutamic acid-N,N-diacetic acid and/or methylglycine diacetic acid and/or the salts thereof, preferably 10 to 20 wt. %, preferably 11 to 18 wt. % and in particular 12 to 15.5 wt. %, very particularly preferably 13 to 15 wt. %, methylglycine diacetic acid and/or the salts thereof, in particular the trisodium salt thereof.

In a preferred embodiment, one of the cleaning agent preparations, preferably cleaning agent preparation B, also contains at least one surfactant, in particular selected from anionic, non-ionic, zwitterionic and amphoteric surfactants. Alternatively, the surfactants can also be contained in a cleaning agent preparation different from cleaning agent preparations A and B. Surfactants are contained in a cleaning agent preparation B, if used, preferably in an amount of up to 40 wt. %, in particular from 2 to 40 wt. % or from 4 to 35 wt. %, particularly preferably in an amount of from 5 to 30 wt. %, in particular from 8 to 25 wt. %.

Cleaning agent preparation A preferably contains less than 2 wt. % surfactant, more preferably less than 1 wt. % surfactant, particularly preferably less than 1 wt. % surfactant, in particular no surfactant, in each case based on the total weight of cleaning agent preparation A.

Non-ionic surfactants that are preferably used are alkoxylated, advantageously ethoxylated, in particular primary alcohols having preferably 8 to 18 C atoms and, on average, 1 to 12 mols of ethylene oxide (EO) per mol of alcohol, in which the alcohol functional group can be linear or preferably methyl-branched in position 2, or can contain linear and methyl-branched functional groups in admixture, as are usually present in oxo alcohol functional groups. However, alcohol ethoxylates having linear functional groups of alcohols of native origin having 12 to 18 C atoms, for example of coconut, palm, tallow fatty or oleyl alcohol and, on average, 2 to 8 EO per mol of alcohol are particularly preferred. Preferred ethoxylated alcohols include, for example, $C_{12-14}$ alcohols having 3 EO, 4 EO or 7 EO, $C_{9-11}$ alcohols having 7 EO, $C_{13-15}$ alcohols having 3 EO, 5 EO, 7 EO or 8 EO, $C_{12-18}$ alcohols having 3 EO, 5 EO or 7 EO, and mixtures thereof, such as mixtures of $C_{12-14}$ alcohol having 3 EO and $C_{12-18}$ alcohol having 7 EO. The degrees of ethoxylation indicated represent statistical averages that can correspond to an integer or a fractional number for a specific product. Preferred alcohol ethoxylates have a narrowed homolog distribution (narrow range ethoxylates, NRE). In addition to these non-ionic surfactants, fatty alcohols having more than 12 EO can also be used. Examples of these are tallow fatty alcohols having 14 EO, 25 EO, 30 EO, or 40 EO. Non-ionic surfactants that contain EO and PO groups together in the molecule can also be used. Block copolymers having EO-PO block units or PO-EO block units can be used, but also EO-PO-EO copolymers or PO-EO-PO copolymers can be used. It is of course also possible to use mixed alkoxylated non-ionic surfactants in which EO and PO units are not distributed in blocks, but rather randomly. Products of this kind can be obtained by the simultaneous action of ethylene oxide and propylene oxide on fatty alcohols.

In a preferred embodiment, the content of non-ionic surfactants in cleaning preparation B is from 5 to 30 wt. %, preferably from 8 to 25 wt. % and in particular from 9 to 15 wt. %, based on the total amount of cleaning preparation B.

In addition to the non-ionic surfactants, cleaning preparation B can also contain anionic surfactants. Anionic surfactants that are used are those of the sulfonate and sulfate types, for example. Surfactants of the sulfonate type that can be used are preferably $C_{9-13}$ alkylbenzene sulfonates, olefin sulfonates, i.e. mixtures of alkene and hydroxyalkane sulfonates, and disulfonates, as obtained, for example, from $C_{12-18}$ monoolefins having a terminal or internal double bond by way of sulfonation with gaseous sulfur trioxide and subsequent alkaline or acid hydrolysis of the sulfonation products. Also suitable are alkane sulfonates obtained from $C_{12-18}$ alkanes, for example by way of sulfochlorination or sulfoxidation with subsequent hydrolysis or neutralization. The esters of a-sulfofatty acids (ester sulfonates) are also suitable, for example the a-sulfonated methyl esters of hydrogenated coconut, palm kernel or tallow fatty acids. The anionic surfactants, including the soaps, can be present in the form of the sodium, potassium or ammonium salts thereof, or as soluble salts of organic bases, such as mono-, di- or triethanolamine. The anionic surfactants are preferably present in the form of the sodium or potassium salts thereof, in particular in the form of the sodium salts.

In a preferred embodiment, the content of anionic surfactants in cleaning preparation B is from 0.1 to 30 wt. %, preferably from 2 to 20 wt. %, based on the total amount of cleaning preparation A.

A preferred pH of cleaning preparations A is between 9 and 14, in particular 9 and 12. If necessary, the pH can be adjusted by means of appropriate pH adjusters, in particular sodium or potassium hydroxide.

Cleaning agent preparations B contain at least one cleaning-active enzyme as the first essential component thereof. The proportion by weight of the cleaning-active enzyme preparation with respect to the total weight of cleaning agent preparation B is preferably between 5 and 80 wt. %, more preferably between 5 and 60 wt. %, particularly preferably between 10 and 50 wt. % and in particular between 10 and 30 wt. %.

The enzymes that are particularly preferably used include, in particular, proteases, amylases, lipases, hemicellulases, cellulases, perhydrolases, or oxidoreductases, as well as preferably mixtures thereof. These enzymes are in principle of natural origin; starting from the natural molecules, variants that have been improved for use in cleaning agents are available, which are preferably used accordingly. Cleaning agents preferably contain enzymes in total amounts of from $1 \times 10^{-6}$ to 5 wt. %, based on active protein. The protein concentration can be determined using known methods, for example the BCA method or the Biuret method.

The stabilizing effect was observed in particular, in addition to the proteases, with the amylases, cellulases and mannanases, as a result of which liquid cleaning agent preparations B that are characterized in that they contain at least one cleaning-active enzyme from the group of amylases and/or proteases and/or cellulases and/or mannanases, in particular from the group of amylases and/or proteases, are preferred.

Examples of amylases are α-amylases from *Bacillus licheniformis*, from *Bacillus amyloliquefaciens* or from *Bacillus stearothermophilus*, as well as in particular the developments thereof that have been improved for use in cleaning agents. The enzyme from *Bacillus licheniformis* is available from Novozymes under the name Termamyl® and from Danisco/Genencor under the name Purastar® ST. Development products of this α-amylase are available from Novozymes under the trade names Duramyl® and Termamyl® ultra, from Danisco/Genencor under the name Purastar® OxAm, and from Daiwa Seiko Inc. as Keistase®. The a-amylase from *Bacillus amyloliquefaciens* is marketed by Novozymes under the name BAN®, and derived variants from the a-amylase from *Bacillus stearothermophilus* are marketed under the names BSG® and Novamyl®, also by Novozymes. Furthermore, the α-amylase from *Bacillus* sp. A 7-7 (DSM 12368) and cyclodextrin glucanotransferase (CGTase) from *Bacillus agaradherens* (DSM 9948) are particularly noteworthy for this purpose. Furthermore, the amylolytic enzymes can be used which are disclosed in international patent applications WO2003002711, WO2003054177 and WO2007079938, the disclosure of which is therefore expressly referred to or the disclosure of which is therefore expressly included in the present patent application. Fusion products of all mentioned molecules can also be used. Furthermore, the developments of the a-amylase from *Aspergillus niger* and *A. oryzae*, available under the trade name Fungamyl® from Novozymes, are suitable. Other commercial products that can advantageously be used are, for example, Amylase-LT®, and Stainzyme® or Stainzyme Ultra® or Stainzyme Plus®, also from Novozymes. Variants of these enzymes obtained by point mutations may also be used.

The a-amylase used in the washing or cleaning agents is preferably selected from:

a) an a-amylase comprising an amino acid sequence which, over its entire length, is at least 80%, preferably at least 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95, 5%, 96%, 96.5%, 97%, 97.5%, 98%, 98.5% and 98.8% identical to the amino acid sequence specified in SEQ ID NO. 5 and optionally has at least one amino acid substitution at one of positions 172, 202, 208, 255 and 261 in the numbering according to SEQ ID NO. 5, preferably selected from the group consisting of M202L, M202V, M202S, M202T, M202I, M202Q, M202W, S255N, R172Q and combinations thereof; and/or b) an a-amylase comprising an amino acid sequence which, over its entire length, is at least 60%, preferably at least 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5% and 98.8% identical to the amino acid sequence specified in SEQ ID NO. 6 and optionally has at least one amino acid substitution at one of positions 9, 26, 30, 33, 82, 37, 106, 118, 128, 133, 149, 150, 160, 178, 182, 186, 193, 195, 202, 203, 214, 231, 256, 257, 258, 269, 270, 272, 283, 295, 296, 298, 299, 303, 304, 305, 311, 314, 315, 318, 319, 320, 323, 339, 345, 361, 378, 383, 419, 421, 437, 441, 444, 445, 446, 447, 450, 458, 461, 471, 482 and 484 and/or a deletion at one of positions 183 and 184 in the numbering according to SEQ ID NO. 6, preferably at least one amino acid substitution at one of positions 9, 26, 149, 182, 186, 202, 257, 295, 299, 323, 339 and 345, particularly preferably selected from the group consisting of R118K, D183*, G184*, N195F, R320K, R458K and combinations thereof; and/or c) an a-amylase comprising an amino acid sequence which, over its entire length, is at least 90% identical to the amino acid sequence specified in SEQ ID NO. 7 and optionally has at least one substitution and/or deletion at one of positions 93, 116, 118, 129, 133, 134, 140, 142, 146, 147, 149, 151, 152, 169, 174, 183, 184, 186, 189, 193, 195, 197, 198, 200, 203, 206, 210, 212, 213, 235, 243, 244, 260, 262, 284, 303, 304, 320, 338, 347, 359, 418, 431, 434, 439, 447, 458, 469, 476 and 477 in the numbering according to SEQ ID NO. 7.

In various embodiments, the amylase comprises an amino acid sequence which, over its entire length, is at least 80%, preferably at least 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95, 5%, 96%, 96.5%, 97%, 97.5%, 98%, 98.5% and 98.8% identical to the amino acid sequence specified in SEQ ID NO. 5 and optionally has at least one amino acid substitution at one of positions 172, 202, 208, 255 and 261 in the numbering according to SEQ ID NO. 5, preferably selected from the group consisting of M202L, M202V, M202S, M202T, M202I, M202Q, M202W, S255N, R172Q and combinations thereof. Amylases are preferably used which have an amino acid substitution at two, preferably three, of the above-mentioned positions, in particular a substitution at position 202 selected from M202L, M202V, M202S, M202T, M202I, M202Q, M202W, a substitution at position 255, in particular S255N, and a substitution at position 172, in particular R172Q. The M202L and M202T mutants are very particularly preferred.

In various embodiments, the amylase comprises an amino acid sequence which, over its entire length, is at least 60%, preferably at least 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5% and 98.8% identical to the amino acid sequence specified in SEQ ID NO. 6 and optionally has at least one amino acid substitution at one of positions 9, 26, 30, 33, 82, 37, 106, 118, 128, 133, 149, 150, 160, 178, 182, 186, 193, 195, 202, 203, 214, 231, 256, 257, 258, 269, 270, 272, 283, 295, 296, 298, 299, 303, 304, 305, 311, 314, 315, 318, 319, 320, 323, 339, 345, 361, 378, 383, 419, 421, 437, 441, 444, 445, 446, 447, 450, 458, 461, 471, 482 and 484 and/or a deletion at one of positions 183 and 184 in the numbering according to SEQ ID NO. 6, preferably at least one amino acid substitution at one of positions 9, 26, 149, 182, 186, 202, 257, 295, 299, 323, 339 and 345, particularly preferably selected from the group consisting of R118K, D183*, G184*, N195F, R320K, R458K and combinations thereof. In various preferred embodiments, the amylase in the numbering according to SEQ ID NO. 6 has amino acid substitutions at three or more of positions 9, 26, 149, 182, 186, 202, 257, 295, 299, 323, 339 and 345 and optionally one or more, preferably all, of the substitutions and/or deletions at positions: 118, 183, 184, 195, 320 and 458, particularly preferably R118K, D183*, G184*, N195F, R320K and/or R458K. In particularly preferred embodiments, the amylase has the following amino acid substitutions and/or deletions in the numbering according to SEQ ID NO. 6: M9L+M323T; M9L+M202L/T/V/I+M323T; M9L+N195F+M202L/T/V/I+M323T; M9L+R118K+D183*+G184*+R320K+M323T+R458K; M9L+R118K+D183*+G184*+M202L/T/V/I+R320K+M323T+R458K; M9L+G149A+G182T+G186A+M202L+T257I+Y295F+N299Y+M323T+A339S+E345R; M9L+G149A+G182T+G186A+M202I+T257I+Y295F+N299Y+M323T+A339S+E345R; M9L+R118K+G149A+G182T+D183*+G184*+G186A+M202L+T257I+Y295F+N299Y+R320K+M323T+A339S+E345R+R458K; M9L+R118K+G149A+G182T+D183*+G184*+G186A+N195F+M202L+T257I+Y295F+N299Y+R320K+M323T+A339S+E345R+R458K; M9L+R118K+G149A+G182T+D183*+G184*+G186A+M202I+T257I+Y295F+N299Y+R320K+M323T+A339S+E345R+R458K; M9L+R118K+D183*+D184*+N195F+M202L+R320K+M323T+R458K; M9L+R118K+D183*+D184*+N195F+M202T+R320K+M323T+R458K; M9L+R118K+D183*+D184*+N195F+M202I+R320K+M323T+R458K; M9L+R118K+D183*+D184*+N195F+M202V+R320K+M323T+R458K; M9L+R118K+N150H+D183*+D184*+N195F+

M202L+V214T+R320K+M323T+R458K; or M9L+ R118K+D183*+D184*+N195F+M202L+V214T+R320K+ M323T+E345N+R458K.

A particularly preferred amylase is the variant which is commercially available under the trade name Stainzyme Plus™ (Novozymes A/S, Bagsvaerd, Denmark).

In various embodiments, the amylase comprises an amino acid sequence which, over its entire length, is at least 90%, preferably at least 90.5%, 91%, 91.5%, 92%, 92.5%, 93%, 93.5%, 94%, 94.5%, 95%, 95.5%, 96%, 96.5%, 97%, 97.5%, 98%, 98.5% and 98.8% identical to the amino acid sequence specified in SEQ ID NO. 7 and optionally has at least one substitution and/or deletion at one of positions 93, 116, 118, 129, 133, 134, 140, 142, 146, 147, 149, 151, 152, 169, 174, 183, 184, 186, 189, 193, 195, 197, 198, 200, 203, 206, 210, 212, 213, 235, 243, 244, 260, 262, 284, 303, 304, 320, 338, 347, 359, 418, 431, 434, 439, 447, 458, 469, 476 and 477 in the numbering according to SEQ ID NO. 7. Preferred amino acid substitutions in this regard include: E260A/D/C/Q/L/M/F/P/S/W/V/G/H/I/K/N/R/T/Y, G304R/ K/E/Q, W140Y/F, W189E/G/T, D134E, F262G/P, W284D/ H/F/Y/R, W347H/F/Y, W439R/G, G476E/Q/R/K, G477E/ Q/K/M/R, N195F/Y, N197F/L, Y198N, Y200F, Y203F, I206H/L/N/F/Y, H210Y, E212V/G, V213A, M116T, Q129L, G133E, E134Y, K142R, P146S, G147E, G149R, N151R, Y152H, Q169E, N174R, A186R, Y243F, S244Q, G303V, R320N, R3591, N418D and A447V.

In various preferred embodiments, washing or cleaning agents can contain at least one second amylase and/or at least one second protease, the second amylase being different from the first amylase and being selected from the above-mentioned group and the second protease being different from the first protease.

If two amylases are contained, these can preferably be used in a mass ratio of from 50:1 to 1:50, preferably from 30:1 to 1:10 (in each case based on the amount of active protein amylase 1 to amylase 2). It is particularly preferred to use a first amylase in a ratio of 20:1 to 2:1, preferably 15:1 to 3:1, particularly preferably 12:1 to 5:1, for example 10:1, to a second amylase.

Further liquid cleaning preparations B preferred contain, based on the total weight of the cleaning agent preparation, from 0.1 to 30 wt. %, preferably from 1.0 to 25 wt. % and in particular from 2.0 to 20 wt. %, cellulase preparations.

Further liquid cleaning preparations B preferred contain, based on the total weight of the cleaning agent preparation, from 0.1 to 30 wt. %, preferably from 1.0 to 25 wt. % and in particular from 2.0 to 20 wt. %, mannanase preparations.

Furthermore, lipases or cutinases can be used, in particular due to their triglyceride-cleaving activities, but also in order to produce peracids in situ from suitable precursors. These include, for example, the lipases that can originally be obtained from Humicola lanuginosa (Thermomyces lanuginosus) or those that have been developed therefrom, in particular those having the amino acid exchange D96L. Furthermore, the cutinases that have been isolated originally from Fusarium solani pisi and Humicola insolens can be used, for example. Lipases and/or cutinases of which the starting enzymes have been isolated originally from Pseudomonas mendocina and Fusarium solanii can also be used.

Further liquid cleaning preparations B preferred contain, based on the total weight of the cleaning agent preparation, from 0.1 to 30 wt. %, preferably from 1.0 to 25 wt. % and in particular from 2.0 to 20 wt. %, lipase preparations.

Moreover, enzymes can be used which can be grouped together under the term "hemicellulases." In addition to the mannanase already mentioned, these include, for example, xanthan lyases, pectin lyases (=pectinases), pectinesterases, pectate lyases, xyloglucanases (=xylanases), pullulanases and b-glucanases.

In order to increase the bleaching effect, oxidoreductases such as oxidases, oxygenases, catalases, peroxidases such as halo-, chloro-, bromo-, lignin, glucose, or manganese peroxidases, dioxygenases or laccases (phenoloxidases, polyphenoloxidases) can be used. Advantageously, organic, particularly preferably aromatic compounds that interact with the enzymes are additionally added in order to enhance the activity of the relevant oxidoreductases (enhancers) or, in the event of greatly differing redox potentials, to ensure the flow of electrons between the oxidizing enzymes and the stains (mediators).

Cleaning-active enzymes, in particular proteases and amylases, are generally not made available in the form of the pure protein, but rather in the form of stabilized, storable and transportable preparations. These ready-made preparations include, for example, the solid preparations obtained through granulation, extrusion, or lyophilization or, particularly in the case of liquid or gel agents, solutions of the enzymes, which are advantageously maximally concentrated, have a low water content, and/or are supplemented with stabilizers or other auxiliaries.

Alternatively, the enzymes can also be encapsulated, for both the solid and the liquid administration form, for example by spray-drying or extrusion of the enzyme solution together with a preferably natural polymer or in the form of capsules, for example those in which the enzymes are enclosed in a set gel, or in those of the core-shell type, in which an enzyme-containing core is coated with a water-, air-, and/or chemical-impermeable protective layer. Further active ingredients such as stabilizers, emulsifiers, pigments, bleaching agents, or dyes can additionally be applied in overlaid layers. Such capsules are applied using inherently known methods, for example by shaking or roll granulation or in fluidized bed processes. Such granules are advantageously low in dust, for example due to the application of polymeric film-formers, and stable in storage due to the coating.

Moreover, it is possible to formulate two or more enzymes together, so that a single granule exhibits a plurality of enzyme activities.

Liquid cleaning agent preparations B particularly preferred therefore contain, based on the total weight of the cleaning agent preparation, from 7 to 40 wt. %, in particular from 10 to 30 wt. %, protease preparations and from 2 to 20 wt. %, in particular from 4.0 to 16 wt. %, amylase preparations, used, which each contain from 0.4 to 20 wt. %, in particular from 0.8 to 10 wt. %, active protein.

A plurality of enzymes and/or enzyme preparations, preferably liquid protease preparations and/or amylase preparations, and optionally cellulase preparations and/or mannanase preparations, are preferably used.

A preferred pH of cleaning agent preparations B is between 6 and 9.

Cleaning agent preparations B of the cleaning agent product forms preferably contain less than 2.5 wt. % complexing agent. They preferably contain less than 2.5 wt. % complexing agent and/or builders. Lowering the complexing agent content below these upper limits has been found to be advantageous for cleaning performance. By further lowering the content of complexing agents well below the upper limits, a further increase in the cleaning performance of cleaning agent product forms can surprisingly be achieved.

Correspondingly, cleaning agent product forms preferred are characterized in that cleaning agent preparation B contains less than 2.0 wt. % complexing agent, preferably less than 1.0 wt. % complexing agent, particularly preferably less than 0.5 wt. % complexing agent, and in particular no complexing agent.

The total amount of the complexing agent and/or builders contained in cleaning agent preparation B is preferably less than 10 wt. %, more preferably less than 6 wt. %, particularly preferably less than 2 wt. % and in particular 0 wt. %.

Organic solvents constitute an optional component of the cleaning agent preparations, in particular cleaning agent preparation B. Preferred organic solvents are derived from the group of monohydric or polyhydric alcohols, alkanolamines or glycol ethers. The solvents are preferably selected from ethanol, n-propanol or i-propanol, butanol, glycol, propanediol or butanediol, glycerol, monoethanolamine, diglycol, propyl diglycol or butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether or propylene glycol propyl ether, dipropylene glycol methyl ether or dipropylene glycol ethyl ether, methoxytriglycol, ethoxytriglycol or butoxytriglycol, 1-butoxyethoxy-2-propanol, 3-methyl-3-methoxybutanol, propylene-glycol-t-butylether, and mixtures of these solvents. Preferred solvents are preferably selected from glycerol, 1,2-propylene glycol, 1,3-propylene glycol, dipropylene glycol and polyethylene glycols, in particular those polyethylene glycols which have an average molecular weight of between 100 and 800, preferably 200 and 600 g/mol. The proportion by weight of these organic solvents with respect to the total weight of each of the cleaning agent preparations is preferably from 5 to 80 wt. %, more preferably from 10 to 60 wt. % and in particular from 20 to 50 wt. %.

A particularly preferred organic solvent which is particularly effective in stabilizing the cleaning agent preparation, in particular cleaning agent preparation B, is 1,2-propylene glycol. The proportion by weight of 1,2-propylene glycol with respect to the total weight of cleaning agent preparations B can vary within wide limits, but preparations which contain, based on the total weight of the relevant cleaning agent preparation B, from 5 to 80 wt. %, preferably from 10 to 60 wt. % and in particular from 20 to 50 wt. %, 1,2-propylene glycol have been found to be particularly stable. Corresponding preparations are therefore preferred.

Another optional component of cleaning agent preparations B is a boric acid or a boric acid derivative. In addition to boric acid, boronic acids or the salts or esters thereof are particularly preferably used, including above all derivatives having aromatic groups, for example ortho-, meta- or para-substituted phenylboronic acids, in particular 4-formylphenylboronic acid (4-FPBA), or the salts or esters of the mentioned compounds. The proportion by weight of boric acid or boric acid derivatives with respect to the total weight of cleaning agent preparations B is preferably from 0.001 to 10 wt. %, more preferably from 0.002 to 6 wt. % and in particular from 0.05 to 3 wt. %.

A particularly preferred boric acid derivative which is particularly effective in stabilizing the cleaning agent preparation is 4-formylphenyl boronic acid. The proportion by weight of 4-formylphenyl boronic acid with respect to the total weight of the cleaning agent preparations can vary within wide limits, but preparations which contain, based on the total weight of cleaning agent preparation B, from 0.001 to 10 wt. %, preferably from 0.002 to 6 wt. % and in particular from 0.05 to 3 wt. %, have been found to be particularly stable. Corresponding preparations are therefore preferred.

Another optional component of the cleaning agent preparations is a Ca or Mg ion source. The proportion by weight of the Ca or Mg ion source with respect to the total weight of cleaning agent preparations B is preferably from 0.01 to 10 wt. %, more preferably from 0.2 to 8 wt. % and in particular from 0.5 to 5 wt. %.

The organic calcium salts have been found to be particularly preferred Ca ion sources which are particularly effective in stabilizing cleaning agent preparation B.

The proportion by weight of the organic calcium salts with respect to the total weight of the cleaning agent preparations can vary within wide limits, but preparations which contain, based on the total weight of the cleaning agent preparation, from 0.01 to 10 wt. %, preferably from 0.2 to 8 wt. % and in particular from 0.5 to 5 wt. % organic calcium salts have been found to be particularly stable. Corresponding preparations are therefore preferred.

For enzyme stabilization, cleaning agent preparations B can also contain polyols, in particular sorbitol.

Liquid cleaning agent preparations B contain, based on the total weight thereof, preferably 30 wt. % or less, more preferably 25 wt. % or less, in particular 15 wt. % or less, water. In a further preferred embodiment, cleaning agent preparations B contain, based on the total weight thereof, 0.5 to 30 wt. %, preferably 1.0 to 25 wt. %, and in particular 1.5 to 30 wt. %, water.

In a preferred embodiment, the cleaning agent product form further comprises a liquid cleaning agent preparation C, with cleaning agent preparation C being different from cleaning agent preparations A and B.

In a preferred embodiment, in the automatic dishwashing process, cleaning agent preparations A and B and active ingredient composition D are used in combination with at least one further cleaning agent preparation C. When used in a dishwashing process, this cleaning agent preparation C preferably contains surfactants and/or acids, more preferably surfactants and acids.

The use of a surfactant- and/or acid-containing cleaning agent preparation C can improve the rinsing performance achieved in the dishwashing process. This applies in particular to preferred process variants in which cleaning agent preparations A, B and C are dispensed in a time-staggered manner. The non-ionic surfactants described above are particularly suitable as surfactant additives for cleaning agent preparation C. However, non-ionic surfactants of general formula $R^1$—$CH(OH)CH_2O$-$(AO)_w$-$(A'O)_x$-$(A''O)_y$-$(A'''O)_z$—$R^2$ are preferably used, in which $R^1$ represents a straight-chain or branched, saturated or mono- or polyunsaturated $C_{6-24}$ alkyl or alkenyl functional group;

$R^2$ represents a linear or branched hydrocarbon functional group having 2 to 26 carbon atoms;

A, A', A" and A'" represent, independently of one another, a functional group from the group
—$CH_2CH_2$, —$CH_2CH_2$—$CH_2$, —$CH_2$—$CH(CH_3)$, —$CH_2$—$CH_2$—$CH_2$—$CH_2$, —$CH_2$—$CH(CH_3)$—$CH_2$—, —$CH_2$—$CH(CH_2$—$CH_3)$, w, x, y and z represent values of between 0.5 and 120, where x, y and/or z can also be 0.

Finally, the non-ionic surfactants of the general formula $R^1$—$CH(OH)CH_2O$-$(AO)_w$—$R^2$ have been found to be particularly effective, in which R¹ represents a straight-chain or branched, saturated or mono- or polyunsaturated $C_{6-24}$ alkyl or alkenyl functional group;

R² represents a linear or branched hydrocarbon functional group having 2 to 26 carbon atoms;

A represents a functional group from the group $CH_2CH_2$, —$CH_2CH_2$—$CH_2$, —$CH_2$—$CH(CH_3)$; and w represents values of between 1 and 120, preferably 10 to 80, in particular 20 to 40.

The group of these non-ionic surfactants includes, for example, $C_{4-22}$ fatty alcohol-$(EO)_{10-80}$-2-hydroxyalkyl ethers, in particular also $C_{8-12}$ fatty alcohol-$(EO)_{22}$-2-hydroxydecyl ethers and $C_{4-22}$ fatty alcohol-$(EO)_{40-80}$-2-hydroxyalkyl ethers.

The proportion by weight of the non-ionic surfactant with respect to the total weight of cleaning agent preparation C is preferably from 1.0 to 20 wt. %, more preferably from 2.0 to 18 wt. %, particularly preferably from 4.0 to 15 wt. %, and in particular from 6.0 to 12 wt. %.

In a further particularly preferred embodiment, at least one cleaning agent preparation, in particular at least one cleaning agent preparation further comprising a non-ionic surfactant, particularly preferably at least cleaning agent preparation B and/or D, contains at least one hydrotropic substance (also referred to as a solubilizer in the following). Preferred hydrotropic substances are xylene sulfonate, cumene sulfonate, urea and/or N-methylacetamide, particularly preferably cumene sulfonate and/or xylene sulfonate, in particular cumene sulfonate. It has been found that the use of hydrotropic substances, in particular cumene sulfonate, enormously improves phase stability with regard to temperature fluctuations. This can be observed in particular for preparations which contain at least one non-ionic surfactant. Particularly preferably, at least cleaning agent preparation C, in particular cleaning agent preparations C and B, contains at least one hydrotropic substance, preferably xylene sulfonate, cumene sulfonate, urea and/or N-methylacetamide, particularly preferably cumene sulfonate and/or xylene sulfonate, in particular cumene sulfonate, preferably in an amount of from 2 to 25 wt. %, in particular from 4 to 20 wt. % and particularly preferably in an amount of from 6 to 15, for example from 7 to 12 wt. %, based on the total weight of the particular cleaning agent preparation.

The weight ratio of the at least one non-ionic surfactant to the at least one hydrotropic substance, preferably xylene sulfonate, cumene sulfonate, urea and/or N-methylacetamide, particularly preferably cumene sulfonate and/or xylene sulfonate, in particular cumene sulfonate, is preferably from 2:1 to 1:2, in particular from 1.6:1 to 1:1.

In addition or as an alternative to the non-ionic surfactants, cleaning agent preparations C preferably contain at least one acidifying agent when used in a dishwashing process. Acidifying agents can be added to cleaning agent preparations C in order to lower the pH of the liquor in the rinse cycle. Both inorganic acids and organic acids are suitable here, provided that they are compatible with the other ingredients. For reasons of consumer protection and handling safety, the solid mono-, oligo- and polycarboxylic acids in particular can be used. From this group, formic acid, citric acid, tartaric acid, succinic acid, malonic acid, adipic acid, maleic acid, fumaric acid, oxalic acid and polyacrylic acid are again preferred. Organic sulfonic acids such as sulfamic acid can also be used. Sokalan® DCS (trademark of BASF), a mixture of succinic acid (max. 31 wt. %), glutaric acid (max. 50 wt. %) and adipic acid (max. 33 wt. %), can be obtained commercially and can also preferably be used as an acidifying agent. Cleaning preparations C, which, based on the total weight of cleaning agent preparation C, contain one or more acidifying agents, preferably mono-, oligo- and polycarboxylic acids, particularly preferably formic acid, tartaric acid, succinic acid, malonic acid, adipic acid, maleic acid, fumaric acid, oxalic acid and polyacrylic acid, and in particular formic acid, acetic acid and/or citric acid in amounts of from 0.1 to 12 wt. %, preferably 0.2 to 10 wt. %, and in particular 0.3 to 8.0 wt. %, are preferred embodiments.

The use of formic acid is preferred because, in addition to its acid function for improving the rinsing result, it also has a positive effect on the storage stability of cleaning preparation C, which is subject to strong temperature fluctuations due to storage in the interior of the dishwasher, as explained above. It also has a disinfectant effect, and therefore the number of bacteria is reduced when formic acid is used in the rinse cycle. This applies both to bacteria that are in the rinsing liquor of the rinse cycle and to those that are in the rinsing liquor remaining in the bottom of the dishwasher during and after the washing process and in the interior of the dishwasher. This can also reduce the number of residual germs on the washed dishes.

It is particularly advantageous if an active ingredient composition D, in particular comprising fragrances and/or scent traps, and simultaneously formic acid as an acidifying agent are used in preparation C. Formic acid itself has a slightly pungent odor that is unpleasant for sensitive consumers. Due to the separate storage of the active ingredient composition and the release of the at least one active ingredient D, in particular if it is one or more fragrances, in particular those preferred above, and/or one or more scent traps, in particular zinc ricinoleate, for example, there is no unpleasant odor inside the dishwasher either during the dishwashing process or in the time between the cleaning cycles.

Cleaning agent preparations A, B and C described above differ in terms of their composition, and so are not identical.

Furthermore, cleaning agent preparations A, B and/or C preferably contain at least one glass corrosion inhibitor when used in a dishwashing process.

Preparation(s) A and/or preparation(s) C particularly preferably contain an appropriate amount of glass corrosion inhibitor(s). These glass corrosion inhibitors are preferably selected from water-soluble zinc salts, preferably zinc chloride, zinc sulfate and/or zinc acetate, particularly preferably zinc acetate, polyalkyleneimines, in particular polyethyleneimines.

In a preferred embodiment, the preparations, in particular preparations A and/or C, contain at least one zinc salt, in particular inorganic or organic, as a glass corrosion inhibitor as a further component. The inorganic zinc salt is preferably selected from the group consisting of zinc bromide, zinc chloride, zinc iodide, zinc nitrate, and zinc sulfate. The organic zinc salt is preferably selected from the group consisting of zinc salts of monomeric or polymeric organic acids, particularly from the group of zinc acetate, zinc acetyl acetonate, zinc benzoate, zinc formiate, zinc lactate, zinc gluconate, zinc ricinoleate, zinc abietate, zinc valerate, and zinc-p-toluene sulfonate. In an embodiment that is particularly preferred, zinc acetate is used as a zinc salt.

The zinc salt is preferably contained in cleaning agent preparations in an amount of from 0.01 wt. % to 5 wt. %, particularly preferably in an amount of from 0.05 wt. % to 3 wt. %, in particular in an amount of from 0.1 wt. % to 2 wt. %, based on the total weight of the particular cleaning agent preparation, in particular the particular cleaning agent preparation A or C.

Polyethyleneimines such as those which are available under the name Lupasol® (BASF) are preferably used as glass corrosion inhibitors in an amount of from 0 to 5 wt. %, in particular from 0.01 to 2 wt. %, based on the total weight of the relevant preparation.

The composition of some exemplary cleaning agent combinations or cleaning agent product forms, comprising cleaning agent preparations A, B and C, can be found in the following table.

of electrical or electronic means such as pumps, etc. At the same time, the chambers are preferably emptied almost completely, that is to say without large residual amounts of the cleaning agent compositions to be dosed. This is advantageous for the consumer and for the environment because only small amounts of the cleaning agent preparations remain unused in the chambers of the packaging means or the cartridge.

TABLE 1

|  | Formulation 1 [wt. %] | Formulation 2 [wt. %] | Formulation 3 [wt. %] | Formulation 4 [wt. %] |
| --- | --- | --- | --- | --- |
| Ingredients Washing and cleaning preparation A |  |  |  |  |
| Builder | 2 to 50 | 2 to 50 | 2 to 30 | 4 to 30 |
| MGDA | 0 to 60 | 0 to 30 | 0 to 20 | 0 to 15 |
| Phosphonates, if permitted by regulations | 0 to 10 | 1 to 9 | 1.2 to 8 | 1.5 to 6 |
| Misc. | to make up to 100 | to make up to 100 | to make up to 100 | to make up to 100 |
| Ingredients Washing and cleaning preparation B |  |  |  |  |
| Enzyme preparation with protease | at least 5 | at least 5 | at least 5 | at least 5 |
| Amylase preparation | at least 5 | at least 5 | at least 5 | at least 5 |
| Surfactants | 2 to 40 | 4 to 40 | 5 to 35 | 5 to 35 |
| Complexing agents | <2.5 | <2.5 | <2.5 | <2.5 |
| Misc. | to make up to 100 | to make up to 100 | to make up to 100 | to make up to 100 |
| Ingredients Washing and cleaning preparation C |  |  |  |  |
| Surfactants, preferably non-ionic surfactants | 0-40 | 2.0-18 | 4.0-15 | 6.0-12.0 |
| Acid, preferably formic acid | 0.1-12 | 0.2-10 | 0.3-8.0 | 0.3-8.0 |
| Zinc salt | 0.01-5.0 | 0.05-3.0 | 0.05-3.0 | 0.1-2.0 |
| Hydrotropic substance, in particular cumene sulfonate | 2-25 | 4-20 | 6-15 | 6-15 |
| Misc. | to make up to 100 | to make up to 100 | to make up to 100 | to make up to 100 |

The combination of cleaning agents described above is packaged by means of a packaging means in which cleaning agent preparations A and B or A, B and C are separate from one another. This separation can be achieved, for example, by receiving chambers that are separate from one another, each of these receiving chambers containing one of the combined cleaning agents. Examples of such packaging forms are cartridges having two, three, four or more separate receiving chambers, for example two-, three-, four- or multi-chamber bottles. Separating the cleaning agents of different compositions can prevent undesired reactions due to chemical incompatibility.

The viscosity of all cleaning agent preparations A and B or A, B and C is preferably less than 120 mPas, in particular from 1 to 100 mPas, more particularly from 10 to 80 mPas, preferably from 20 to 60 mPas (measured at 20° C. using a Brookfield Instrument LVDV II+, spindle 31, 100 rpm). This is advantageous in that the cleaning agent preparations can be dosed from the packaging means only by opening a valve on the underside of the packaging means (in particular of the cartridge) under gravity, preferably without the involvement It is also preferred that the packaging material is designed as a water-soluble or water-dispersible multi-chamber pouch in which preparations A and B and optionally further preparations are in the individual chambers separately from one another. Such multi-chamber pouches and the production thereof are adequately described in the prior art, for example in WO2015/132279 A1, the disclosure of which is hereby incorporated by reference in its entirety. The embodiments mentioned above and below also apply to such multi-chamber pouches containing the liquid cleaning agent preparation alone and the cleaning agent combination of cleaning agent preparation A and cleaning agent preparation B.

In addition to preparations A and B, according to a preferred embodiment at least one active ingredient composition, preferably separate from the cleaning agent preparations, in particular from cleaning agent preparations A and B, is additionally present in the packaging means, which active ingredient composition contains at least one carrier material, preferably a water-insoluble carrier material, and at least one active ingredient D. These are preferably In a particularly preferred embodiment, the polymeric carrier material of the particles consists at least in portions of ethylene-vinyl acetate copolymer. A further preferred subject of the present application is therefore a cleaning agent product form as described above, characterized in that a polymeric carrier material contains at least 10 wt. %, preferably at least 30 wt. %, particularly preferably at least 70 wt. %, ethylene-vinyl acetate copolymer, and is preferably made entirely of ethylene-vinyl acetate copolymer.

Ethylene-vinyl acetate copolymers is the term for copolymers consisting of ethylene and vinyl acetate. In principle, this polymer is prepared in a process comparable to the preparation of low-density polyethylene (LDPE). As the proportion of vinyl acetate increases, the crystallinity of the polyethylene is interrupted and in this way the melting and softening points and the hardness of the resulting products are reduced. The vinyl acetate also makes the copolymer more polar and thus improves its adhesion to polar substrates.

The ethylene-vinyl acetate copolymers described above are widely available commercially, for example under the trademark Elvax® (Dupont). In the context, particularly suitable polyvinyl alcohols are, for example, Elvax® 265, Elvax® 240, Elvax® 205W, Elvax® 200W, as well as Elvax® 360. Products available under the trademark Evatane® (Arkema), for example, are also suitable.

In the context, in particular in the field of fragrancing the interiors of automatic dishwashers, active ingredient compositions are particularly preferred in which ethylene-vinyl acetate copolymer is used as the polymeric carrier material and this copolymer contains from 5 to 50 wt. % vinyl acetate, preferably from 10 to 40 wt. % vinyl acetate, and in particular from 20 to 30 wt. % vinyl acetate, in each case based on the total weight of the copolymer. Other suitable carrier materials are the cyclodextrins.

As an alternative or in addition to the aforementioned carrier materials, inorganic carrier materials are also preferably used. Cleaning agent product forms characterized in that at least one of the carrier materials is an inorganic carrier material, preferably a silicate, phosphate or borate, are particularly preferred.

The silicates, phosphates or borates are preferably in the form of a glass, particularly preferably in the form of a water-soluble glass. Particularly preferred glasses are glasses containing zinc and/or bismuth, in particular glasses containing bismuth phosphate and/or zinc phosphate. In such a case, the carrier material is water-soluble and its substance already contains the active ingredient directly, in particular the glass corrosion inhibitors zinc and/or bismuth in the carrier material.

In a preferred embodiment, the cleaning agent product forms can contain such glasses containing zinc or bismuth, particularly preferably glass containing zinc phosphate, in addition to a further active ingredient composition comprising a carrier material, preferably a water-insoluble carrier material and at least one active ingredient D. These can then be contained in a common chamber or in separate chambers, in particular in one or more chambers, which have openings, in particular openings such that the rinsing liquor and/or air can flow therethrough. Cleaning agent product forms which contain a glass containing zinc phosphate or bismuth phosphate and also contain at least one, preferably two, three or more active ingredient compositions which comprise one or more fragrances and/or one or more scent traps as active ingredients are preferred.

In the context of the present application, thermoplastic carrier materials or carrier materials which deform plastically under the action of the ambient temperatures occurring during use are particularly preferred. The plastic deformation of the carrier materials in the course of one or more applications results in a change in the carrier material surface, in particular a change in the size of the carrier material surface, which in turn has an advantageous effect on the release profile and the release kinetics of the cleaning-active ingredients contained in the active ingredient compositions. Dosing devices characterized in that at least one polymeric carrier material has a melting or softening point of between 40 and 125° C., preferably between 60 and 100° C., particularly preferably a melting point of 70 to 90° C. and in particular between 73 and 80° C. (preferred method of determination for the melting point in accordance with ISO 11357-3) are preferred.

The cleaning agent product forms are particularly suitable for multiple dosing of the active ingredients contained therein. In order to ensure such multiple dosing over a large number of cleaning processes, it has been found to be advantageous to use exclusively water-insoluble carrier materials. These water-insoluble carrier materials also simplify the production of product forms. Preferred product forms are therefore characterized in that all the carrier materials used are water-insoluble.

In principle, the active ingredient compositions can assume all states of matter and/or spatial shapes that can be realized depending on the chemical and physical properties of the carrier materials. In a further embodiment, at least one of the active ingredient compositions is in the form of a gel.

In a further embodiment, at least one of the active ingredient compositions is in the form of a solid. Active ingredient compositions are particularly preferably used in the form of individual blocks comprising an entire active ingredient composition.

The active ingredient compositions can preferably be in particulate form, the active ingredient compositions in which the carrier material of at least one of the active ingredient compositions is in particle form being particularly preferred, these particles preferably having an average diameter of from 0.5 to 20 mm, more preferably from 1 to 10 mm and in particular from 3 to 6 mm.

Active ingredient compositions are particularly preferably used which comprise at least one colored active ingredient composition. By coloring at least one of the active ingredient compositions, a visual differentiation of these compositions can be achieved and the multiple uses of these different compositions can be shown in a simple manner. Furthermore, however, the dyes are also suitable as indicators, in particular as consumption indicators, for the colored active ingredient compositions.

Preferred dyes, which can be selected by a person skilled in the art without any difficulty, are highly stable in storage, unaffected by the other ingredients of the agent, insensitive to light and do not have pronounced substantivity with respect to the substrates to be treated with the dye-containing agents, such as glass, ceramics or plastics dishware, in order to avoid dyeing said fibers.

When choosing the colorant, it must be ensured that the colorants are highly stable in storage, are insensitive to light and do not have too strong an affinity for glass, ceramics or plastics dishware. At the same time, when choosing suitable colorants, it must be taken into account that colorants have different levels of stability with respect to oxidation. In general, water-insoluble colorants are more stable with respect to oxidation than water-soluble colorants. The concentration of the colorant in the cleaning agents varies depending on the solubility and thus also on the sensitivity to oxidation. In the case of highly water-soluble colorants, colorant concentrations in the range of from a few $10^{-2}$ to $10^{-3}$ wt. % are typically selected. In contrast, in the case of the pigment dyes, which are particularly preferred because of their brightness, but which are less water-soluble, the suitable concentration of the colorant in cleaning agents is typically a few $10^{-3}$ to $10^{-4}$ wt. %.

According to a preferred embodiment, the cleaning agent product form is characterized in that the at least one active ingredient D is selected from the group of fragrances, preferably linalyl acetate, dihydromyrcenol, citronellonitrile, menthyl acetate, methylphenylbutanol, eucalyptol, and mixtures thereof, scent traps such as zinc ricinoleate, cyclodextrins, 2-menthyl-5-cyclohexylpentanol and 1-cyclohexylethanol, in particular zinc ricinoleate, dye, glass corrosion inhibitors, antimicrobial active ingredients, germicides or fungicides, and mixtures thereof, preferably mixtures of at least one scent trap, preferably with one, two, three or more scents and/or at least one dye. Mixtures of at least one fragrance, preferably two, three or more fragrances and at least one dye, are also preferred.

Individual odorant compounds, such as the synthetic products of the ester, ether, aldehyde, ketone, alcohol, and hydrocarbon types, can be used as perfume oils or fragrances. However, mixtures of different odorants are preferably used which together produce an appealing fragrance note. Perfume oils of this kind can also contain natural odorant mixtures, as are obtainable from plant sources, e.g. pine, citrus, jasmine, patchouli, rose or ylang-ylang oil.

If it is to be perceptible, an odorant must be volatile, wherein, in addition to the nature of the functional groups and the structure of the chemical compound, the molar mass also plays an important role. Therefore, most odorants have molar masses of up to approximately 200 daltons, whereas molar masses of 300 daltons and above represent something of an exception. Due to the differing volatility of odorants, the odor of a perfume or fragrance composed of multiple odorants varies over the course of vaporization, wherein the odor impressions are divided into "top note," "middle note or body" and "end note or dry out." Because the perception of an odor also depends to a large extent on the odor intensity, the top note of a perfume or fragrance is not made up only of highly volatile compounds, whereas the end note comprises for the most part less volatile, i.e. adherent odorants. In the composition of perfumes, more volatile odorants can be bound, for example, to specific fixatives, which prevents them from evaporating too quickly. The division of odorants into "more volatile" and "adherent" odorants below thus provides no information about the impression of the odor and whether the corresponding odorant is perceived as a top note or middle note.

The fragrances can be processed directly, but it may also be advantageous to apply the fragrances to carriers, which ensure long-lasting fragrance through slower fragrance release. Cyclodextrins, for example, have been found to be suitable as such carrier materials, it being possible for the cyclodextrin-perfume complexes to be coated with further auxiliaries.

The fragrances may be or include linalyl acetate, dihydromyrcenol, citronellonitrile, menthyl acetate, methylphenylbutanol, eucalyptol, and mixtures thereof.

The known ricenolates, in particular zinc ricenoleates, for example, can be used as scent traps (or, as used synonymously below, odor neutralizers or fragrance neutralizers, agents against malodor or bad odors). 2-menthyl-5-cyclohexylpentanol and 1-cyclohexylethanol are also preferred as scent traps. Activated carbon and/or cyclodextrins and/or zeolites, preferably acid-modified zeolites, can also be particularly preferably used. Zinc ricinoleate alone or in combination with one or more of the aforementioned fragrances and/or scent traps is particularly preferred, since it also has a positive effect on inhibiting glass corrosion during the washing process.

To combat microorganisms, antimicrobial active ingredients can be used as an alternative or in addition to the aforementioned fragrances and/or scent traps. Here, depending on the antimicrobial spectrum and mechanism of action, a distinction is made between bacteriostatic and bactericidal agents, fungistatic and fungicidal agents, etc. Important substances from these groups are, for example, benzalkonium chlorides, alkyl aryl sulfonates, halophenols and phenylmercuric acetate, although these compounds can also be dispensed with entirely.

In principle, the active ingredients can be contained in the active ingredient preparations in any desired amounts. However, dosing devices are particularly preferred in which the proportion by weight of the active ingredient(s) is from 1 to 70 wt. %, preferably from 10 to 60 wt. %, particularly preferably from 20 to 50 wt. %, in particular from 30 to 40 wt. %, in each case based on the total weight of the active ingredient composition(s).

If more than one active ingredient composition (a cleaning agent combination) is present in the cleaning agent product form, these can be present in the packaging means of the cleaning agent product form separately from one another or next to one another. The different active ingredient compositions can preferably be present in the packaging means of the cleaning agent product form next to one another, i.e. in direct contact with one another.

The present application also relates to a cleaning agent product form, comprising
 a) a cleaning agent preparation A in an amount sufficient for carrying out an automatic dishwashing process at least twice, preferably at least four times and in particular at least eight times;
 b) at least one further cleaning agent preparation B different from A in an amount sufficient for carrying out an automatic dishwashing process at least twice, preferably at least four times and in particular at least eight times;
 c) optionally a further cleaning agent preparation C, which is different from A and B, in a sufficient amount to carry out an automatic dishwashing process at least twice, preferably at least four times and in particular at least eight times;
 d) optionally at least one further active ingredient composition different from A and B in an amount sufficient for carrying out an automatic dishwashing process at least twice, preferably at least four times and in particular at least eight times, which composition contains at least one carrier material, preferably a water-insoluble carrier material, and at least one active ingredient D;
 e) a cartridge for cleaning agent preparations A and B or A, B and C or A, B, C and D, in which cleaning agent preparations A and B or A, B, C or A, B, C and D are in separate receiving chambers.

The present application also relates to a cleaning agent dosing system, comprising
 a) a cleaning agent preparation A in an amount sufficient for carrying out an automatic dishwashing process at least twice, preferably at least four times and in particular at least eight times;
 b) at least one further cleaning agent preparation B different from A in an amount sufficient for carrying out an automatic dishwashing process at least twice, preferably at least four times and in particular at least eight times;

c) optionally a further cleaning agent preparation C, which is different from A and B, in a sufficient amount to carry out an automatic dishwashing process at least twice, preferably at least four times and in particular at least eight times;

d) optionally at least one further active ingredient composition different from A and B in an amount sufficient for carrying out an automatic dishwashing process at least twice, preferably at least four times and in particular at least eight times, which composition contains at least one carrier material, preferably a water-insoluble carrier material, and at least one active ingredient D;

e) a cartridge for cleaning agent preparations A, B and C or A, B, C and D, in which cleaning agent preparations A, B, C or A, B, C and D are in separate receiving chambers;

f) a dosing device detachably connected to the cartridge.

In a preferred embodiment, the above-described cartridges of the cleaning agent product forms are provided with a dosing device that can be detached from the cartridge. Such a dosing device can be connected to the cartridge by means of an adhesive, latching, snap or plug-in connection, for example. Separating the cartridge and the dosing device simplifies the filling of the cartridge, for example. Alternatively, the detachable connection between the cartridge and the dosing device allows the cartridges on the dosing device to be exchanged. Such an exchange may be indicated, for example, when the cleaning program is changed or after the cartridge has been completely emptied.

A particularly preferred subject of this application is a cleaning agent dosing system, comprising a) a cleaning agent product form, comprising a sufficient amount of cleaning agent preparations A and B or A, B and C or A, B, C and D for carrying out an automatic dishwashing process at least twice, preferably at least four times, and in particular at least eight times;

b) a dosing device detachably connected to the cleaning agent product form.

It goes without saying that cleaning agent product forms in which the cartridge and the dosing device are non-detachably interconnected are also conceivable.

The present application also relates to a cleaning agent dosing system, comprising a) a cleaning agent product form, comprising a sufficient amount of cleaning agent preparations A and B or A, B and C or A, B, C and D for carrying out an automatic dishwashing process at least twice, preferably at least four times, and in particular at least eight times;

b) a dosing device non-detachably connected to the cleaning agent product form.

In a preferred embodiment, the above-mentioned cleaning agent dosing systems, comprising the cleaning agent product form (and optionally one or two further compositions which are different from cleaning agent preparations A and B or A, B and C or A, B, C and D), a cartridge and a dosing device detachably connected to the cartridge, are provided in a common outer packaging, the filled cartridge and the dosing device being contained in the outer packaging particularly preferably separately from one another. The outer packaging is used for storing, transporting and presenting the cleaning agent product form and protects said product form from contamination, impact and shock. In particular, for presentation purposes, the outer packaging should be at least partially transparent.

As an alternative or in addition to an outer packaging, there is of course the possibility of marketing the cleaning agent product form in connection with a dishwasher. Such a combination is particularly advantageous for cases where the progression of the automatic dishwashing process (e.g. duration, temperature curve, water supply) and the cleaning agent formulation or the control electronics of the dosing device are coordinated with one another.

The dosing system consists of the basic components of a cartridge filled with the cleaning agent and a dosing device which can be coupled to the cartridge and is in turn formed from further assemblies, such as component carriers, actuators, closing elements, sensors, energy sources and/or control units.

It is preferable for the dosing system to be movable. Within the meaning of this application, "movable" means that the dosing system is not non-detachably connected to a water-conveying device such as a dishwasher or the like, but rather, for example, can be removed by the user from a dishwasher or positioned in a dishwasher, i.e. it can be handled independently.

According to an alternative embodiment, it is also conceivable that the dosing device is connected to a water-conveying device such as a dishwasher or the like such that the user cannot detach it, and only the cartridge is movable.

Since the preparations to be dosed can have a pH of between 2 and 14, in particular 2 and 12, depending on the intended use, all components of the dosing system that come into contact with the preparations should have corresponding acid and/or alkali resistance. Furthermore, by selecting suitable materials, these components should be largely chemically inert, for example with respect to non-ionic surfactants, enzymes and/or fragrances.

Within the meaning of this application, a cartridge is understood to mean a package which is suitable for surrounding or holding together flowable or dispersible preparations and which can be coupled to a dosing device to dispense the preparation. In particular, a cartridge can also comprise several chambers, which can be filled with compositions that are different from one another. It is also conceivable for a plurality of containers to be arranged to form a cartridge unit.

It is advantageous for the cartridge to comprise at least one outlet opening, which is arranged such that the preparation can be released from the container under gravity in the use position of the dosing device. As a result, no further conveying means for releasing the preparation from the container are required, and therefore the design of the dosing device can be kept simple and the production costs can be kept low.

In a preferred embodiment, at least one second chamber for receiving at least one second flowable or dispersible preparation is provided, the second chamber comprising at least one outlet opening, which is arranged such that a product can be released from the second chamber under gravity in the use position of the dosing device. The arrangement of a second chamber is in particular advantageous when preparations that are not usually storage-stable in combination, such as bleaching agents and enzymes, are stored in the separate containers.

Furthermore, it is necessary for more than two, in particular three, four or five chambers to be provided in or on a cartridge. In particular, at least one of the chambers for dispensing active ingredient(s) D, such as a glass corrosion inhibitor, a fragrance or in particular an odor neutralizer, into the environment is designed such that it comprises openings through which the rinsing liquor and/or air can flow.

In a further embodiment, the cartridge is formed in one piece. As a result, the cartridges can be formed cost-effectively in one production step, in particular by suitable blow molding methods. In this case, the chambers of a cartridge can be separated from one another, for example by partitions or material bridges.

The cartridge can also be formed in multiple pieces by components produced in injection molding and then joined together. Furthermore, it is conceivable that the cartridge is formed in multiple pieces such that at least one chamber, preferably all chambers, can be removed from the dosing device or inserted into the dosing device individually. As a result, in the event of an unequally heavy consumption of a preparation from one chamber, it is possible to exchange an already emptied chamber while the other chambers which can still be filled with preparation remain in the dosing device. This can achieve a targeted and needs-based refilling of the individual chambers or their preparations.

The chambers of a cartridge can be fixed to one another by suitable connecting methods, such that a container unit is formed. The chambers can be fixed so as to be detachable or non-detachable from one another by a suitable form-fitting, frictional or integral connection.

In particular, the fixing can be carried out by one or more methods of connection from the group of snap-in connections, hook and loop fastenings, press fits, fused joints, adhesive connections, welded connections, soldered connections, screw connections, keyed joints, clamping connections or snap connections. In particular, the fixing can also be formed by a heat shrink tube (so-called sleeve) which is pulled over the whole cartridge or portions of the cartridge in a heated state and tightly surrounds the chambers or the cartridge in the cooled state.

In order to provide the chambers with advantageous residual emptying properties, the bottom of the chambers can be inclined in a funnel shape toward the dispensing opening. Furthermore, the inner wall of a chamber can, by suitable choice of material and/or surface design, be designed such that the preparation has little material adhesion to the inner chamber wall. This measure can also further optimize the residual emptying of a chamber.

The chambers of a cartridge may have the same or different filling volumes. In a configuration comprising two chambers, the ratio of the container volumes is preferably 5:1; in a configuration comprising three chambers, it is preferably 4:1:1, these configurations being particularly suitable for use in dishwashers.

As mentioned above, the cartridge preferably has 3, 4, 5 or 6 chambers. For the use of such a cartridge in a dishwasher, it is particularly preferred that the first chamber contains an alkaline cleaning preparation, the second chamber contains an enzymatic preparation and the third chamber contains a clear rinser, the volume ratio of the compartments being approximately 4:1:1. The fourth chamber contains the at least one active ingredient composition, comprising the at least one active ingredient D and a carrier material, preferably a water-insoluble carrier material.

A dosing chamber can be formed in or on a chamber, upstream of the outlet opening in the flow direction of the preparation. The amount of preparation which is intended to be dispensed from the chamber into the environment upon release of the preparation is established by the dosing chamber. This is advantageous in particular if the closing element of the dosing device, which causes the dispensing of the preparation from a chamber into the environment, can only be put into a dispensing and closure state without monitoring the amount being dispensed. The dosing chamber thus ensures that a predefined amount of preparation is released without immediate feedback of the dispensed amount of preparation. The dosing chambers can be formed in one piece or multiple pieces.

According to a further advantageous development, one or more chambers each comprises, in addition to an outlet opening, a liquid-tight sealable chamber opening. This chamber opening makes it possible, for example, to refill preparation stored in this chamber.

In order to ventilate the cartridge chambers, ventilation options can be provided, in particular in the top region of the cartridge, in order to ensure pressure equalization between the interior of the cartridge chambers and the environment when the filling level of the chambers falls. These ventilation options can be designed, for example, as a valve, in particular a silicone valve, micro-openings in the cartridge wall or the like.

If, according to a further embodiment, the cartridge chambers are not ventilated directly, but rather via the dosing device, or there is no ventilation, e.g. when using flexible containers such as pouches, this is advantageous in that, at increased temperatures in the course of a wash cycle of a dishwasher, the heating of the chamber contents causes pressure to build, which pushes the preparations to be dosed toward the outlet openings such that the cartridge can be easily emptied. Furthermore, such air-free packaging does not present the risk of oxidation of substances in the preparation, which makes pouch packaging or bag-in-bottle packaging seem appropriate in particular for preparations sensitive to oxidation.

The cartridge usually has a filling volume of <5,000 ml, in particular <1,000 ml, preferably <500 ml, particularly preferably <250 ml, very particularly preferably <50 ml.

The cartridge can take on any spatial shape. For example, it can be in the form of a cube, a sphere, or a plate.

The cartridge and the dosing device can in particular be designed in terms of their spatial shape such that they ensure the lowest possible loss of usable volume, in particular in a dishwasher.

In order to use the dosing device in dishwashers, it is particularly advantageous for the device to be shaped according to the shape of dishes to be cleaned in dishwashers. For example, said device may be planar, with approximately the same dimensions as a plate. This allows the dosing device to be positioned in a space-saving manner, e.g. in the lower rack of the dishwasher. Furthermore, the correct positioning of the dosing unit is immediately and intuitively revealed to the user due to its plate-like shape. The cartridge preferably has a height:width:depth ratio of between 5:5:1 and 50:50:1, particularly preferably approximately 10:10:1. The "slim" design of the dosing device and the cartridge makes it possible in particular to position the device in the lower cutlery basket of a dishwasher in the receptacles provided for plates. This is advantageous in that the preparations dispensed from the dosing device reach the rinsing liquor directly and cannot adhere to other items to be washed.

Commercially available domestic dishwashers are usually designed such that larger items to be washed, such as pans or large plates, are arranged in the lower rack of the dishwasher. In order to avoid non-optimal positioning of the dosing system by the user in the upper rack, in an advantageous embodiment, the dosing system is of such a size that the dosing system can be positioned only in the receptacles provided therefor in the lower rack. For this purpose, the width and the height of the dosing system can be selected to be in particular between 150 mm and 300 mm, particularly preferably between 175 mm and 250 mm.

However, it is also conceivable to design the dosing unit in the form of a cup having a substantially circular or square base.

In order to protect heat-sensitive components of a preparation located in a cartridge from the effects of heat, it is advantageous to produce the cartridge from a material having low thermal conductivity.

Another possibility for reducing the influence of heat on a preparation in a chamber of the cartridge is to insulate the chamber by suitable measures, for example by using thermal insulation materials, such as styrofoam, which completely or partially enclose the chamber or the cartridge in a suitable manner.

In a preferred embodiment, the cartridge comprises an RFID marker which contains at least information about the contents of the cartridge and which can be read out by the sensor unit.

This information can be used, for example, to select a dosing program stored in the control unit. This can ensure that a dosing program is always used which is optimal for a specific preparation. It may also be the case that in the absence of an RFID label or if there is an RFID label with an incorrect or inaccurate identifier, no dosing is carried out by the dosing device, and instead a visual or acoustic signal is produced which informs the user of the error.

In order to prevent incorrect use of the cartridge, the cartridges can also comprise structural elements which interact with corresponding elements of the dosing device according to the key/lock principle, such that, for example, only cartridges of a specific type can be coupled to the dosing device. This design also makes it possible for information about the cartridge coupled to the dosing device to be transferred to the control unit, which allows the dosing device to be controlled according to the contents of the corresponding container.

The cartridge is in particular designed for receiving flowable cleaning agents. Such a cartridge particularly preferably has a plurality of chambers for the spatially separated reception of preparations of a cleaning agent that are different from one another. The cartridge can be designed such that it can be arranged detachably or in a fixed manner in or on the dishwasher.

The control unit, sensor unit and at least one actuator required for operation are integrated in the dosing device. An energy source is preferably also arranged in the dosing device.

The dosing device preferably consists of a splash-proof housing that prevents splashing water from penetrating the interior of the dosing device, as can occur, for example, when used in a dishwasher.

It is particularly preferable for the dosing device to comprise at least one first interface which interacts with a corresponding interface formed in or on a water-conveying device, in particular a water-conveying domestic appliance, preferably a dishwasher, such that there is transfer of electrical energy from the water-conveying device to the dosing device.

In one embodiment, the interfaces are formed by plug-in connectors. In a further embodiment, the interfaces can be designed such that electrical energy is transferred wirelessly.

In an advantageous development, a second interface is formed on the dosing device and the water-conveying device, such as a dishwasher, for the transmission of electromagnetic signals, which in particular represent information regarding the operating state, measurement and/or control of the dosing device and/or the water-conveying device such as a dishwasher.

An adapter can be used to easily couple the dosing system to a water-conveying domestic appliance. The adapter is used to mechanically and/or electrically connect the dosing system to the water-conveying domestic appliance.

The adapter is preferably rigidly connected to a water-conveying line of the domestic appliance. However, it is also conceivable to provide the adapter for positioning in or on the domestic appliance, where the adapter is caught by the water flow and/or spray jet of the domestic appliance.

The adapter makes it possible to implement a dosing system both for a stand-alone version and a built-in version. It is also possible to design the adapter as a type of charging station for the dosing system, in which, for example, the energy source of the dosing device is charged or data are exchanged between the dosing device and the adapter.

The adapter can be arranged in a dishwasher on one of the inner walls of the washing chamber, in particular on the inner face of the dishwasher door. However, it is also conceivable for the adapter as such to be positioned in the water-conveying domestic appliance where it is not accessible to the user, such that the dosing device is inserted into the adapter for example during assembly of the domestic appliance, with the adapter, the dosing device and the domestic appliance being designed such that a cartridge can be coupled to the dosing device by the user.

The cleaning agent product forms are suitable for use in dishwashing, although the use of a cleaning agent product form or a cleaning agent dosing system for washing dishes in an automatic dishwashing process is preferred.

As stated at the outset, the cleaning agents are distinguished by a particular physical and chemical stability, in particular with respect to temperature fluctuations. The cleaning agents are therefore exceptionally suitable for dosing by means of a dosing system located in the interior of a dishwasher. A dosing system of this type, which can be immovably integrated in the interior of the dishwasher (machine-integrated dosing device), but of course can also be introduced into the interior as a movable device (self-sufficient dosing device), contains many times the amount of cleaning agent needed to carry out an automatic cleaning process.

Within the meaning of this application, "movable" means that the dispensing and dosing system is not non-detachably connected to a device such as a dishwasher or the like, but can be removed from a dishwasher or positioned in a dishwasher, for example.

This application also relates to the use of a cleaning agent product form for filling i) a cartridge of a dosing system integrated immovably in the interior of a dishwasher, or ii) a movable cartridge of a dosing system intended to be positioned in the interior of a dishwasher with an amount of said cleaning agent product form sufficient for carrying out an automatic dishwashing process at least twice, preferably at least four times and in particular at least eight times.

An example of an immovable cartridge is a container that is immovably integrated in the interior of a dishwasher, for example in the side wall or the inner lining of the door of the dishwasher. An example of a movable cartridge is a container that is introduced into the interior of the dishwasher by the consumer and remains there during the entire course of a cleaning cycle. Such a cartridge can be integrated in the interior, for example by simply being placed in the cutlery basket or dish rack, but can also be removed again from the interior of the dishwasher by the consumer.

The cleaning agent or cleaning agent combination is dosed from the cartridge into the interior of the dishwasher, as described above, preferably by means of a dosing device that can be detached from the cartridge. Such a dosing device can be connected to the cartridge by means of an adhesive, latching, snap or plug-in connection. However, cartridges having a non-detachably connected dosing device can of course also be used.

The use of a cleaning agent product form as a cleaning agent reservoir for i) a dosing device integrated immovably in the interior of a dishwasher or ii) a movable dosing device intended to be positioned in the interior of a dishwasher is preferred.

The present application also relates to the use of a cleaning agent dosing system as a cleaning agent reservoir for a dishwasher.

Two further subjects of this application are the use of a cleaning agent product form, comprising
  a) a cleaning agent preparation A in an amount sufficient for carrying out an automatic dishwashing process at least twice, preferably at least four times and in particular at least eight times;
  b) at least one further cleaning agent preparation B different from A in an amount sufficient for carrying out an automatic dishwashing process at least twice, preferably at least four times and in particular at least eight times;
  c) optionally a further cleaning agent preparation C, which is different from A and B, in a sufficient amount to carry out an automatic dishwashing process at least twice, preferably at least four times and in particular at least eight times;
  d) optionally at least one further active ingredient composition different from A and B in an amount sufficient for carrying out an automatic dishwashing process at least twice, preferably at least four times and in particular at least eight times, which composition contains at least one carrier material, preferably a water-insoluble carrier material, and at least one active ingredient D;
  e) a cartridge for cleaning agent preparations A and B or A, B and C or A, B, C and D, in which cleaning agent preparations A, B, C or A, B, C and D are in separate receiving chambers, as a cleaning agent reservoir for
    i) a dosing device integrated immovably in the interior of a dishwasher, or
    ii) a movable dosing device intended to be positioned in the interior of a dishwasher.

The cleaning agents and cleaning agent combinations are, as stated above, preferably used as automatic dishwashing detergents.

An automatic dishwashing process using a cleaning agent product form or a cleaning agent dosing system according to one of the preceding claims, in the course of which, from a cartridge located in the interior of the dishwasher,
  a partial amount a of cleaning agent preparation A located in the cartridge is dosed into the interior of the dishwasher, a residual amount of the cleaning agent preparation located in the cartridge remaining in the cartridge until the end of the dishwashing process, characterized in that this residual amount corresponds to at least twice, preferably at least four times, and in particular at least eight times, the partial amount a; and
  a partial amount b of cleaning agent preparation B located in the cartridge is dosed into the interior of the dishwasher, a residual amount of the cleaning agent preparation located in the cartridge remaining in the cartridge until the end of the dishwashing process, characterized in that this residual amount corresponds to at least twice, preferably at least four times, and in particular at least eight times, the partial amount b; and
  optionally a partial amount c of cleaning agent preparation C optionally located in the cartridge is dosed into the interior of the dishwasher, a residual amount of the cleaning agent preparation located in the cartridge remaining in the cartridge until the end of the dishwashing process, characterized in that this residual amount corresponds to at least twice, preferably at least four times, and in particular at least eight times, the partial amount c,
  optionally a partial amount d of active ingredients D optionally located in the cartridge is dosed into the interior of the dishwasher, a residual amount of the active ingredient located in the cartridge remaining in the cartridge until the end of the dishwashing process, characterized in that this residual amount corresponds to at least twice, preferably at least four times, and in particular at least eight times, the partial amount d, and According to a preferred embodiment, an automatic dishwashing process is disclosed where the active ingredient composition is located in the cartridge and the rinsing liquor and/or air flows through the composition via openings. When air flows through the composition, fragrance(s) are in particular dispensed into the air in the interior of the dishwasher and, in addition to fragrancing the rinsing liquor during the dishwashing process, this also leads to a pleasant odor for the consumer when opening and loading the dishwasher between the individual wash cycles.

In the dishwashing process, it is of course possible to use not only the cleaning agent product forms but also the cleaning agent dosing systems.

In a preferred embodiment, cleaning agent preparation A and cleaning agent preparation B and optionally cleaning agent preparation C are dosed at different times in the cleaning cycle.

Another preferred subject of this application is therefore an automatic dishwashing process using a cleaning agent product form or a cleaning agent dosing system, in the course of which
  a) at a time t1, from a cartridge located in the interior of the dishwasher, a partial amount a of cleaning agent preparation A located in the cartridge is dosed into the interior of the dishwasher, a residual amount of the cleaning agent located in the cartridge remaining in the cartridge until the end of the dishwashing process, which residual amount corresponds to at least twice, preferably at least four times, and in particular at least eight times, the partial amount a;
  b) at at least one additional time $t2 \neq t1$, from a cartridge located in the interior of the dishwasher, a partial amount b of cleaning agent preparation B located in the second cartridge and different from cleaning agent preparation A is dosed into the interior of the dishwasher, a residual amount of the cleaning agent located in this cartridge remaining in the cartridge until the end of the dishwashing process, which residual amount corresponds to at least twice, preferably at least four times, and in particular at least eight times, the partial amount b;

c) optionally, at at least one additional time t3≠t2≠t1, from a cartridge located in the interior of the dishwasher, a partial amount d of cleaning agent preparation C located in a further cartridge and different from cleaning agent preparations A and B is dosed into the interior of the dishwasher, a residual amount of the cleaning agent located in this cartridge remaining in the cartridge until the end of the dishwashing process, which residual amount corresponds to at least twice, preferably at least four times, and in particular at least eight times, the partial amount d.

In preferred embodiments of the automatic dishwashing process described above with time-staggered dosing of cleaning agent preparations A and B or A, B and C, the time t2 is at least 1 minute, preferably at least 2 minutes and in particular between 3 and 30 minutes, in particular between 3 and 20 minutes, before or after, preferably before, the time t1. In preferred embodiments of the automatic dishwashing process described above with time-staggered dosing of the minute, preferably at least 2 minutes and in particular between 3 and 30 minutes, in particular between 3 and 20 minutes, before or after, preferably after, the time t1.

In a preferred embodiment, cleaning preparation B is dosed into the interior at a temperature of 20-35° C., then cleaning preparation A is dosed at a temperature of 30-60° C. and then cleaning preparation C is dosed at a temperature below 20° C.

PRACTICAL EXAMPLE

Cleaning Performance:

Preparations A and B were automatically dosed into the rinsing liquor in a ratio of 4:1 in the main wash cycle. Cleaning preparation B also contained 30 mg/job of active protein each of two different proteases, as described below.

The cleaning performance of the cleaning agent combination was determined according to the IKW method in a Miele GSL, Eco 45° program, at 21° dH.

TABLE 2

| Ingredients preparation A | Formulation 4 [wt. %] |
|---|---|
| Sodium citrate | 20 |
| Sodium carbonate | 15 |
| Cleaning-active polymer | 10 |

TABLE 2-continued

| Misc. (including water, dye) | to make up to 100 |
|---|---|
| Ingredients Washing and cleaning preparation B | [wt. %] |
| Amylase preparation (tq) | 10 |
| Surfactants | 15 |
| Solubilizer | 20 |
| Complexing agents | 0 |
| Organic solvent | 35 |
| Misc. (no water) | to make up to 100 |

TABLE 3

Cleaning performance:

| | Cleaning performance | Burnt-in minced meat | Egg yolk |
|---|---|---|---|
| E1 | Cleaning preparation A + Cleaning preparation B with protease 1 (30 mg/job) | 3.2 | 3.9 |
| E2 | Cleaning preparation A + Cleaning preparation B with protease 2 (30 mg/job) | 7.2 | 5.4 |

Cleaning preparation B (E1) contains 30 mg active protein/job (corresponding to the active enzyme protein content/suitable for a cleaning application) protease 1, which contains the protease according to Seq ID NO. 2 of WO2013/060621. Cleaning preparation B (E2) accordingly contains the same amount of active protein/job protease 2, which contains the protease according to Seq ID NO. 5 of WO2017/215925.

It was surprisingly found that both proteases produced good results on protease-sensitive soiling; in particular, when using protease 2, a particularly good cleaning performance can be observed, in particular on egg yolk and burnt-on minced meat.

Surprisingly, it was also found that the cleaning performance of the proteases, in particular also of protease 2, is still adequately maintained even if the cleaning agent preparation has passed through several cleaning cycles in the machine.

The invention claimed is:

1. A cleaning composition comprising:
   a) a liquid cleaning agent preparation A comprising at least one builder; and
   b) a liquid cleaning agent preparation B different from cleaning agent preparation A, wherein the cleaning agent preparation B comprises:
      b1) a surfactant;
      b2) at least one protease having the amino acid sequence of SEQ ID NO: 1 which has at least one amino acid substitution at position 12, 43, 122, 127, 154, 156, 160, 211, 212, or 222 of SEQ ID NO: 1; and
      b3) at least one a-amylase having at least 90% sequence identity to an amino acid sequence selected from the group consisting of SEQ ID NOs: 5, 6, and 7 present in an amount of from 2 to 20 wt %, based on the total weight of the cleaning agent preparation B.

2. The cleaning composition of claim 1, wherein the at least one builder is present in an amount of from 2 to 50 wt. %, based on the total weight of the cleaning composition.

3. The cleaning composition of claim 1, wherein the cleaning agent preparation A further comprises citrate present in an amount of from 3 to 25 wt. %, based on the total weight of the cleaning composition.

4. The cleaning composition of claim 1, further comprising a liquid cleaning agent preparation C different from cleaning agent preparations A and B, wherein the cleaning agent preparation C comprises:
   c1) an acidifying agent;
   c2) a glass corrosion inhibitor;
   c3) a non-ionic surfactant; and
   c4) a hydrotropic substance.

5. The cleaning composition of claim 4, wherein the acidifying agent is selected from the group consisting of formic acid, tartaric acid, succinic acid, malonic acid, adipic acid, maleic acid, fumaric acid, oxalic acid, polyacrylic acid, and any combination thereof.

6. The cleaning composition of claim 1, wherein the surfactant is present in an amount of from 4 to 35 wt. %, based on the total weight of the cleaning composition.

7. The cleaning composition of claim 4, wherein the glass corrosion inhibitor is selected from the group consisting of polyalkyleneimines water-soluble zinc salts, and any combination thereof.

8. The cleaning composition of claim 4, wherein the hydrotropic substance is selected the group consisting of from xylene sulfonate, cumene sulfonate, urea, N-methylacetamide, and any combination thereof.

9. A cleaning agent dosing system comprising:
a) the cleaning composition of claim 4 comprising an amount of cleaning agent preparations A and B as a first combination, or A and B and C as a second combination, sufficient for carrying out an automatic dishwashing process at least twice; and
b) a dosing device detachably connected to the cleaning composition.

10. The cleaning composition of claim 1, wherein the amount of the at least one protease added per wash cycle is from 0.001 to 1,000 mg/job.

11. The cleaning composition of claim 1, wherein the at least one protease is present in an amount of from 7 to 40 wt %, based on the total weight of the cleaning agent preparation B.

12. The cleaning composition of claim 1, further comprising an organic solvent selected from the group consisting of glycerol, 1,2-propylene glycol, 1,3-propylene glycol, dipropylene glycol, polyethylene glycols, and any combination thereof.

13. The cleaning composition of claim 1, wherein the at least one amino acid substitution of SEQ ID NO: 1 is at position:
 i) I43V;
 ii) M122L, NN154S and T156A;
 iii) M211N and P212D;
 iv) M211L and P212D;
 v) G160S;
 vi) D127P, M211L and P212D;
 vii) P212H; or
 viii) Q12L, M122L, and A222S.

14. The cleaning composition of claim 1, wherein the at least one α-amylase has an amino acid sequence which, over its entire length, is at least 95% identical to the amino acid sequence specified in SEQ ID NO: 5.

15. The cleaning composition of claim 14, wherein the amino acid sequence of SEQ ID NO: 5 has at least one amino acid substitution at position 172, 202, 208, 255, or 261 of SEQ ID NO: 5.

16. The cleaning composition of claim 1, wherein the at least one α-amylase has an amino acid sequence which, over its entire length, is at least 95% identical to the amino acid sequence specified in SEQ ID NO: 6.

17. The cleaning composition of claim 16, wherein the amino acid sequence of SEQ ID NO: 6 has at least one amino acid substitution at position 9, 26, 149, 182, 186, 202, 257, 295, 299, 323, 339, or 345 of SEQ ID NO: 6.

18. The cleaning composition of claim 1, wherein the at least one α-amylase has an amino acid sequence which, over its entire length, is at least 95% identical to the amino acid sequence specified in SEQ ID NO: 7.

19. The cleaning composition of claim 1, further comprising water present in an amount of 30 wt % or less, based on the total weight of the cleaning composition.

\* \* \* \* \*

SEQUENCE LISTING

<160> NUMBER OF SEQ ID NOS: 7

<210> SEQ ID NO 1
<211> LENGTH: 269
<212> TYPE: PRT
<213> ORGANISM: Bacillus gibsonii

<400> SEQUENCE: 1

Gln Gln Thr Val Pro Trp Gly Ile Thr Arg Val Gln Ala Pro Thr Val
1               5                   10                  15

His Asn Arg Gly Ile Thr Gly Ser Gly Val Lys Val Ala Ile Leu Asp
            20                  25                  30

Thr Gly Ile Ala Gln His Ser Asp Leu Thr Ile Arg Gly Gly Ala Ser
        35                  40                  45

Phe Val Pro Gly Glu Ser Thr Thr Ala Asp Leu Asn Gly His Gly Thr

```
                50            55              60
His Val Ala Gly Thr Val Ala Leu Asn Asn Ser Ile Gly Val Ile
 65                  70                  75                  80

Gly Val Ala Pro Ser Ala Asp Leu Tyr Ala Val Lys Val Leu Gly Ala
                 85                  90                  95

Asn Gly Arg Gly Ser Val Ser Gly Ile Ala Gln Gly Leu Glu Trp Ala
            100                 105                 110

Ala Thr Asn Asn Met His Ile Ala Asn Met Ser Leu Gly Ser Asp Ala
            115                 120                 125

Pro Ser Thr Thr Leu Glu Arg Ala Val Asn Tyr Ala Thr Ser Arg Gly
130                 135                 140

Val Leu Val Ile Ala Ala Thr Gly Asn Asn Gly Thr Gly Ser Ile Gly
145                 150                 155                 160

Tyr Pro Ala Arg Tyr Ala Asn Ala Met Ala Val Gly Ala Thr Asp Gln
                165                 170                 175

Asn Asn Arg Arg Ala Ser Phe Ser Gln Tyr Gly Thr Gly Ile Asp Ile
            180                 185                 190

Val Ala Pro Gly Val Gly Ile Gln Ser Thr Tyr Leu Asn Asn Ser Tyr
195                 200                 205

Ala Ser Met Pro Gly Thr Ser Met Ala Thr Pro His Val Ala Gly Val
210                 215                 220

Ala Ala Leu Val Lys Gln Lys Asn Pro Ser Trp Asn Ala Thr Gln Ile
225                 230                 235                 240

Arg Asn His Leu Lys Asn Thr Ala Thr Asn Leu Gly Asn Ser Ser Gln
                245                 250                 255

Phe Gly Ser Gly Leu Val Asn Ala Asp Ala Ala Thr Arg
            260                 265

<210> SEQ ID NO 2
<211> LENGTH: 269
<212> TYPE: PRT
<213> ORGANISM: Bacillus lentus

<400> SEQUENCE: 2

Ala Gln Ser Val Pro Trp Gly Ile Ser Arg Val Gln Ala Pro Ala Ala
 1               5                  10                  15

His Asn Arg Gly Leu Thr Gly Ser Gly Val Lys Val Ala Val Leu Asp
                20                  25                  30

Thr Gly Ile Ser Thr His Pro Asp Leu Asn Ile Arg Gly Gly Ala Ser
            35                  40                  45

Phe Val Pro Gly Glu Pro Ser Thr Gln Asp Gly Asn Gly His Gly Thr
 50                  55                  60

His Val Ala Gly Thr Ile Ala Leu Asn Asn Ser Ile Gly Val Leu
 65                  70                  75                  80

Gly Val Ala Pro Ser Ala Glu Leu Tyr Ala Val Lys Val Leu Gly Ala
                 85                  90                  95

Ser Gly Ser Gly Ser Val Ser Ser Ile Ala Gln Gly Leu Glu Trp Ala
            100                 105                 110

Gly Asn Asn Gly Met His Val Ala Asn Leu Ser Leu Gly Ser Pro Ser
            115                 120                 125

Pro Ser Ala Thr Leu Glu Gln Ala Val Asn Ser Ala Thr Ser Arg Gly
130                 135                 140

Val Leu Val Val Ala Ala Ser Gly Asn Ser Gly Ala Gly Ser Ile Ser
145                 150                 155                 160
```

Tyr Pro Ala Arg Tyr Ala Asn Ala Met Ala Val Gly Ala Thr Asp Gln
                165                 170                 175

Asn Asn Asn Arg Ala Ser Phe Ser Gln Tyr Gly Ala Gly Leu Asp Ile
            180                 185                 190

Val Ala Pro Gly Val Asn Val Gln Ser Thr Tyr Pro Gly Ser Thr Tyr
        195                 200                 205

Ala Ser Leu Asn Gly Thr Ser Met Ala Thr Pro His Val Ala Gly Ala
    210                 215                 220

Ala Ala Leu Val Lys Gln Lys Asn Pro Ser Trp Ser Asn Val Gln Ile
225                 230                 235                 240

Arg Asn His Leu Lys Asn Thr Ala Thr Ser Leu Gly Ser Thr Asn Leu
                245                 250                 255

Tyr Gly Ser Gly Leu Val Asn Ala Glu Ala Ala Thr Arg
            260                 265

<210> SEQ ID NO 3
<211> LENGTH: 269
<212> TYPE: PRT
<213> ORGANISM: Bacillus alkalophilus

<400> SEQUENCE: 3

Ala Gln Ser Val Pro Trp Gly Ile Ser Arg Val Gln Ala Pro Ala Ala
1               5                   10                  15

His Asn Arg Gly Leu Thr Gly Ser Gly Val Lys Val Ala Val Leu Asp
            20                  25                  30

Thr Gly Ile Ser Thr His Pro Asp Leu Asn Ile Arg Gly Gly Ala Ser
        35                  40                  45

Phe Val Pro Gly Glu Pro Ser Thr Gln Asp Gly Asn Gly His Gly Thr
    50                  55                  60

His Val Ala Gly Thr Ile Ala Ala Leu Asn Asn Ser Ile Gly Val Leu
65                  70                  75                  80

Gly Val Ala Pro Asn Ala Glu Leu Tyr Ala Val Lys Val Leu Gly Ala
                85                  90                  95

Ser Gly Ser Gly Ser Val Ser Ser Ile Ala Gln Gly Leu Glu Trp Ala
            100                 105                 110

Gly Asn Asn Gly Met His Val Ala Asn Leu Ser Leu Gly Ser Pro Ser
        115                 120                 125

Pro Ser Ala Thr Leu Glu Gln Ala Val Asn Ser Ala Thr Ser Arg Gly
    130                 135                 140

Val Leu Val Val Ala Ala Ser Gly Asn Ser Gly Ala Gly Ser Ile Ser
145                 150                 155                 160

Tyr Pro Ala Arg Tyr Ala Asn Ala Met Ala Val Gly Ala Thr Asp Gln
                165                 170                 175

Asn Asn Asn Arg Ala Ser Phe Ser Gln Tyr Gly Ala Gly Leu Asp Ile
            180                 185                 190

Val Ala Pro Gly Val Asn Val Gln Ser Thr Tyr Pro Gly Ser Thr Tyr
        195                 200                 205

Ala Ser Leu Asn Gly Thr Ser Met Ala Thr Pro His Val Ala Gly Ala
    210                 215                 220

Ala Ala Leu Val Lys Gln Lys Asn Pro Ser Trp Ser Asn Val Gln Ile
225                 230                 235                 240

Arg Asn His Leu Lys Asn Thr Ala Thr Ser Leu Gly Ser Thr Asn Leu
                245                 250                 255

Tyr Gly Ser Gly Leu Val Asn Ala Glu Ala Ala Thr Arg
            260                 265

<210> SEQ ID NO 4
<211> LENGTH: 269
<212> TYPE: PRT
<213> ORGANISM: Bacillus lentus

<400> SEQUENCE: 4

```
Ala Gln Ser Val Pro Trp Gly Ile Ser Arg Val Gln Ala Pro Ala Ala
1               5                   10                  15

His Asn Arg Gly Leu Thr Gly Ser Gly Val Lys Val Ala Val Leu Asp
            20                  25                  30

Thr Gly Ile Ser Thr His Pro Asp Leu Asn Ile Arg Gly Gly Ala Ser
        35                  40                  45

Phe Val Pro Gly Glu Pro Ser Thr Gln Asp Gly Asn Gly His Gly Thr
    50                  55                  60

His Val Ala Gly Thr Ile Ala Ala Leu Asn Asn Ser Ile Gly Val Leu
65                  70                  75                  80

Gly Val Ala Pro Ser Ala Glu Leu Tyr Ala Val Lys Val Leu Gly Ala
                85                  90                  95

Asp Gly Arg Gly Ala Ile Ser Ser Ile Ala Gln Gly Leu Glu Trp Ala
            100                 105                 110

Gly Asn Asn Gly Met His Val Ala Asn Leu Ser Leu Gly Ser Pro Ser
        115                 120                 125

Pro Ser Ala Thr Leu Glu Gln Ala Val Asn Ser Ala Thr Ser Arg Gly
    130                 135                 140

Val Leu Val Val Ala Ala Ser Gly Asn Ser Gly Ala Ser Ser Ile Ser
145                 150                 155                 160

Tyr Pro Ala Arg Tyr Ala Asn Ala Met Ala Val Gly Ala Thr Asp Gln
                165                 170                 175

Asn Asn Asn Arg Ala Ser Phe Ser Gln Tyr Gly Ala Gly Leu Asp Ile
            180                 185                 190

Val Ala Pro Gly Val Asn Val Gln Ser Thr Tyr Pro Gly Ser Thr Tyr
        195                 200                 205

Ala Ser Leu Asn Gly Thr Ser Met Ala Thr Pro His Val Ala Gly Ala
    210                 215                 220

Ala Ala Leu Val Lys Gln Lys Asn Pro Ser Trp Ser Asn Val Gln Ile
225                 230                 235                 240

Arg Asn His Leu Lys Asn Thr Ala Thr Ser Leu Gly Ser Thr Asn Leu
                245                 250                 255

Tyr Gly Ser Gly Leu Val Asn Ala Glu Ala Ala Thr Arg
            260                 265
```

<210> SEQ ID NO 5
<211> LENGTH: 485
<212> TYPE: PRT
<213> ORGANISM: Bacillus sp.

<400> SEQUENCE: 5

```
His His Asn Gly Thr Asn Gly Thr Met Met Gln Tyr Phe Glu Trp Tyr
1               5                   10                  15

Leu Pro Asn Asp Gly Asn His Trp Asn Arg Leu Asn Ser Asp Ala Ser
            20                  25                  30

Asn Leu Lys Ser Lys Gly Ile Thr Ala Val Trp Ile Pro Pro Ala Trp
        35                  40                  45

Lys Gly Ala Ser Gln Asn Asp Val Gly Tyr Gly Ala Tyr Asp Leu Tyr
    50                  55                  60
```

```
Asp Leu Gly Glu Phe Asn Gln Lys Gly Thr Val Arg Thr Lys Tyr Gly
 65                  70                  75                  80

Thr Arg Ser Gln Leu Gln Ala Ala Val Thr Ser Leu Lys Asn Asn Gly
             85                  90                  95

Ile Gln Val Tyr Gly Asp Val Val Met Asn His Lys Gly Gly Ala Asp
            100                 105                 110

Ala Thr Glu Met Val Arg Ala Val Glu Val Asn Pro Asn Asn Arg Asn
        115                 120                 125

Gln Glu Val Thr Gly Glu Tyr Thr Ile Glu Ala Trp Thr Arg Phe Asp
    130                 135                 140

Phe Pro Gly Arg Gly Asn Thr His Ser Ser Phe Lys Trp Arg Trp Tyr
145                 150                 155                 160

His Phe Asp Gly Val Asp Trp Asp Gln Ser Arg Arg Leu Asn Asn Arg
                165                 170                 175

Ile Tyr Lys Phe Arg Gly His Gly Lys Ala Trp Asp Trp Glu Val Asp
            180                 185                 190

Thr Glu Asn Gly Asn Tyr Asp Tyr Leu Met Tyr Ala Asp Ile Asp Met
        195                 200                 205

Asp His Pro Glu Val Val Asn Glu Leu Arg Asn Trp Gly Val Trp Tyr
210                 215                 220

Thr Asn Thr Leu Gly Leu Asp Gly Phe Arg Ile Asp Ala Val Lys His
225                 230                 235                 240

Ile Lys Tyr Ser Phe Thr Arg Asp Trp Ile Asn His Val Arg Ser Ala
                245                 250                 255

Thr Gly Lys Asn Met Phe Ala Val Ala Glu Phe Trp Lys Asn Asp Leu
            260                 265                 270

Gly Ala Ile Glu Asn Tyr Leu Gln Lys Thr Asn Trp Asn His Ser Val
        275                 280                 285

Phe Asp Val Pro Leu His Tyr Asn Leu Tyr Asn Ala Ser Lys Ser Gly
    290                 295                 300

Gly Asn Tyr Asp Met Arg Asn Ile Phe Asn Gly Thr Val Val Gln Arg
305                 310                 315                 320

His Pro Ser His Ala Val Thr Phe Val Asp Asn His Asp Ser Gln Pro
                325                 330                 335

Glu Glu Ala Leu Glu Ser Phe Val Glu Glu Trp Phe Lys Pro Leu Ala
            340                 345                 350

Tyr Ala Leu Thr Leu Thr Arg Glu Gln Gly Tyr Pro Ser Val Phe Tyr
        355                 360                 365

Gly Asp Tyr Tyr Gly Ile Pro Thr His Gly Val Pro Ala Met Arg Ser
    370                 375                 380

Lys Ile Asp Pro Ile Leu Glu Ala Arg Gln Lys Tyr Ala Tyr Gly Lys
385                 390                 395                 400

Gln Asn Asp Tyr Leu Asp His His Asn Ile Ile Gly Trp Thr Arg Glu
                405                 410                 415

Gly Asn Thr Ala His Pro Asn Ser Gly Leu Ala Thr Ile Met Ser Asp
            420                 425                 430

Gly Ala Gly Gly Ser Lys Trp Met Phe Val Gly Arg Asn Lys Ala Gly
        435                 440                 445

Gln Val Trp Ser Asp Ile Thr Gly Asn Arg Thr Gly Thr Val Thr Ile
    450                 455                 460

Asn Ala Asp Gly Trp Gly Asn Phe Ser Val Asn Gly Gly Ser Val Ser
465                 470                 475                 480
```

Ile Trp Val Asn Lys
            485

<210> SEQ ID NO 6
<211> LENGTH: 485
<212> TYPE: PRT
<213> ORGANISM: Bacillus sp.

<400> SEQUENCE: 6

His His Asn Gly Thr Asn Gly Thr Met Met Gln Tyr Phe Glu Trp Tyr
1               5                   10                  15

Leu Pro Asn Asp Gly Asn His Trp Asn Arg Leu Arg Ser Asp Ala Ser
            20                  25                  30

Asn Leu Lys Asp Lys Gly Ile Ser Ala Val Trp Ile Pro Pro Ala Trp
        35                  40                  45

Lys Gly Ala Ser Gln Asn Asp Val Gly Tyr Gly Ala Tyr Asp Leu Tyr
50                  55                  60

Asp Leu Gly Glu Phe Asn Gln Lys Gly Thr Ile Arg Thr Lys Tyr Gly
65                  70                  75                  80

Thr Arg Asn Gln Leu Gln Ala Ala Val Asn Ala Leu Lys Ser Asn Gly
                85                  90                  95

Ile Gln Val Tyr Gly Asp Val Val Met Asn His Lys Gly Gly Ala Asp
            100                 105                 110

Ala Thr Glu Met Val Arg Ala Val Glu Val Asn Pro Asn Asn Arg Asn
        115                 120                 125

Gln Glu Val Ser Gly Glu Tyr Thr Ile Glu Ala Trp Thr Lys Phe Asp
130                 135                 140

Phe Pro Gly Arg Gly Asn Thr His Ser Asn Phe Lys Trp Arg Trp Tyr
145                 150                 155                 160

His Phe Asp Gly Val Asp Trp Asp Gln Ser Arg Lys Leu Asn Asn Arg
                165                 170                 175

Ile Tyr Lys Phe Arg Gly Asp Gly Lys Gly Trp Asp Trp Glu Val Asp
            180                 185                 190

Thr Glu Asn Gly Asn Tyr Asp Tyr Leu Met Tyr Ala Asp Ile Asp Met
        195                 200                 205

Asp His Pro Glu Val Val Asn Glu Leu Arg Asn Trp Gly Val Trp Tyr
210                 215                 220

Thr Asn Thr Leu Gly Leu Asp Gly Phe Arg Ile Asp Ala Val Lys His
225                 230                 235                 240

Ile Lys Tyr Ser Phe Thr Arg Asp Trp Ile Asn His Val Arg Ser Ala
                245                 250                 255

Thr Gly Lys Asn Met Phe Ala Val Ala Glu Phe Trp Lys Asn Asp Leu
            260                 265                 270

Gly Ala Ile Glu Asn Tyr Leu Asn Lys Thr Asn Trp Asn His Ser Val
        275                 280                 285

Phe Asp Val Pro Leu His Tyr Asn Leu Tyr Asn Ala Ser Lys Ser Gly
290                 295                 300

Gly Asn Tyr Asp Met Arg Gln Ile Phe Asn Gly Thr Val Val Gln Arg
305                 310                 315                 320

His Pro Met His Ala Val Thr Phe Val Asp Asn His Asp Ser Gln Pro
                325                 330                 335

Glu Glu Ala Leu Glu Ser Phe Val Glu Trp Phe Lys Pro Leu Ala
            340                 345                 350

Tyr Ala Leu Thr Leu Thr Arg Glu Gln Gly Tyr Pro Ser Val Phe Tyr
        355                 360                 365

```
Gly Asp Tyr Tyr Gly Ile Pro Thr His Gly Val Pro Ala Met Lys Ser
            370                 375                 380

Lys Ile Asp Pro Ile Leu Glu Ala Arg Gln Lys Tyr Ala Tyr Gly Arg
385                 390                 395                 400

Gln Asn Asp Tyr Leu Asp His His Asn Ile Ile Gly Trp Thr Arg Glu
                405                 410                 415

Gly Asn Thr Ala His Pro Asn Ser Gly Leu Ala Thr Ile Met Ser Asp
            420                 425                 430

Gly Ala Gly Gly Asn Lys Trp Met Phe Val Gly Arg Asn Lys Ala Gly
        435                 440                 445

Gln Val Trp Thr Asp Ile Thr Gly Asn Arg Ala Gly Thr Val Thr Ile
    450                 455                 460

Asn Ala Asp Gly Trp Gly Asn Phe Ser Val Asn Gly Gly Ser Val Ser
465                 470                 475                 480

Ile Trp Val Asn Lys
            485

<210> SEQ ID NO 7
<211> LENGTH: 485
<212> TYPE: PRT
<213> ORGANISM: Bacillus sp.

<400> SEQUENCE: 7

His His Asn Gly Thr Asn Gly Thr Met Met Gln Tyr Phe Glu Trp His
1               5                   10                  15

Leu Pro Asn Asp Gly Asn His Trp Asn Arg Leu Arg Asp Asp Ala Ser
            20                  25                  30

Asn Leu Arg Asn Arg Gly Ile Thr Ala Ile Trp Ile Pro Pro Ala Trp
        35                  40                  45

Lys Gly Thr Ser Gln Asn Asp Val Gly Tyr Gly Ala Tyr Asp Leu Tyr
50                  55                  60

Asp Leu Gly Glu Phe Asn Gln Lys Gly Thr Val Arg Thr Lys Tyr Gly
65                  70                  75                  80

Thr Arg Ser Gln Leu Glu Ser Ala Ile His Ala Leu Lys Asn Asn Gly
                85                  90                  95

Val Gln Val Tyr Gly Asp Val Val Met Asn His Lys Gly Gly Ala Asp
            100                 105                 110

Ala Thr Glu Asn Val Leu Ala Val Glu Val Asn Pro Asn Asn Arg Asn
        115                 120                 125

Gln Glu Ile Ser Gly Asp Tyr Thr Ile Glu Ala Trp Thr Lys Phe Asp
130                 135                 140

Phe Pro Gly Arg Gly Asn Thr Tyr Ser Asp Phe Lys Trp Arg Trp Tyr
145                 150                 155                 160

His Phe Asp Gly Val Asp Trp Asp Gln Ser Arg Gln Phe Gln Asn Arg
                165                 170                 175

Ile Tyr Lys Phe Arg Gly Asp Gly Lys Ala Trp Asp Trp Glu Val Asp
            180                 185                 190

Ser Glu Asn Gly Asn Tyr Asp Tyr Leu Met Tyr Ala Asp Val Asp Met
        195                 200                 205

Asp His Pro Glu Val Val Asn Glu Leu Arg Arg Trp Gly Glu Trp Tyr
210                 215                 220

Thr Asn Thr Leu Asn Leu Asp Gly Phe Arg Ile Asp Ala Val Lys His
225                 230                 235                 240

Ile Lys Tyr Ser Phe Thr Arg Asp Trp Leu Thr His Val Arg Asn Ala
```

```
                    245                 250                 255
Thr Gly Lys Glu Met Phe Ala Val Ala Glu Phe Trp Lys Asn Asp Leu
                260                 265                 270

Gly Ala Leu Glu Asn Tyr Leu Asn Lys Thr Asn Trp Asn His Ser Val
            275                 280                 285

Phe Asp Val Pro Leu His Tyr Asn Leu Tyr Asn Ala Ser Asn Ser Gly
        290                 295                 300

Gly Asn Tyr Asp Met Ala Lys Leu Leu Asn Gly Thr Val Val Gln Lys
305                 310                 315                 320

His Pro Met His Ala Val Thr Phe Val Asp Asn His Asp Ser Gln Pro
                325                 330                 335

Gly Glu Ser Leu Glu Ser Phe Val Gln Glu Trp Phe Lys Pro Leu Ala
                340                 345                 350

Tyr Ala Leu Ile Leu Thr Arg Glu Gln Gly Tyr Pro Ser Val Phe Tyr
            355                 360                 365

Gly Asp Tyr Tyr Gly Ile Pro Thr His Ser Val Pro Ala Met Lys Ala
        370                 375                 380

Lys Ile Asp Pro Ile Leu Glu Ala Arg Gln Asn Phe Ala Tyr Gly Thr
385                 390                 395                 400

Gln His Asp Tyr Phe Asp His His Asn Ile Ile Gly Trp Thr Arg Glu
                405                 410                 415

Gly Asn Thr Thr His Pro Asn Ser Gly Leu Ala Thr Ile Met Ser Asp
                420                 425                 430

Gly Pro Gly Gly Glu Lys Trp Met Tyr Val Gly Gln Asn Lys Ala Gly
            435                 440                 445

Gln Val Trp His Asp Ile Thr Gly Asn Lys Pro Gly Thr Val Thr Ile
        450                 455                 460

Asn Ala Asp Gly Trp Ala Asn Phe Ser Val Asn Gly Gly Ser Val Ser
465                 470                 475                 480

Ile Trp Val Lys Arg
                485
```